US008391589B2

(12) United States Patent
Kotake et al.

(10) Patent No.: US 8,391,589 B2
(45) Date of Patent: Mar. 5, 2013

(54) INFORMATION PROCESSING APPARATUS AND METHOD FOR CALCULATING THE POSITION AND ORIENTATION OF AN IMAGE SENSING DEVICE

(75) Inventors: Daisuke Kotake, Yokohama (JP); Shinji Uchiyama, Yokohama (JP); Hirokazu Kato, Hirakata (JP)

(73) Assignee: Canon Kabushiki Kaisha, Tokyo (JP)

( * ) Notice: Subject to any disclaimer, the term of this patent is extended or adjusted under 35 U.S.C. 154(b) by 1455 days.

(21) Appl. No.: 12/013,123

(22) Filed: Jan. 11, 2008

(65) Prior Publication Data

US 2008/0172201 A1 Jul. 17, 2008

(30) Foreign Application Priority Data

Jan. 17, 2007 (JP) ................................. 2007-008496

(51) Int. Cl.
*G06K 9/00* (2006.01)
(52) U.S. Cl. .................. 382/154; 382/291; 382/312
(58) Field of Classification Search .................. None
See application file for complete search history.

(56) References Cited

U.S. PATENT DOCUMENTS

| 6,307,959 B1* | 10/2001 | Mandelbaum et al. | ....... 382/154 |
| 2007/0115352 A1* | 5/2007 | Oskiper et al. | .................. 348/44 |

OTHER PUBLICATIONS

Kenichi Hayashi et al., A New Framework for Tracking by Maintaining Multiple Global Hypotheses for Augmented Reality, IEEE Computer Society, 2007, pp. 15-22.*
Kenichi Hayashi, et al., A New Framework for Tracking by Maintaining Multiple Global Hypotheses for Augmented Reality, IEICE Technical Report, The Institute of Electronics, Information and Communication Engineers, Japan, vol. 106, No. 470, pp. 13-18.
Ryo Hirose, et al., A Vision-Based AR Registration Method Utilizing Edges of 3D Model, IEICE Technical Report, The Institute of Electronics, Information and Communication Engineers, Japan, vol. 105, No. 536, pp. 123-128.
An Augmented Reality System and its Calibration based on Marker Tracking, Hirokazu Kato, Mark Billinghurst, Koichi Asano and Keihachiro Tachibana, TVRSJ, vol. 4, pp. 607-616, 1999, Japanese Document and English Abstract.
Real-Time Visual Tracking of Complex Structures, IEEE, Transactions on Pattern Analysis and Machine Itelligence, vol. 24, No. 7, Jul. 2002, Tom Drummond and Roberto Cipolla, English Abstract.
A Real-Time Tracker for Markerless Augmented Reality, Andrew I. Comport, Eric Marchand and Francois Chaumette, Oct. 2003, English Abstract.
Combining Edge and Texture Information for Real-Time Accurate 3D Camera Tracking, Luca Vacchetti, Vincent Lepetit and Pascal Fua, 2004, English Abstract.

(Continued)

*Primary Examiner* — Brian P Werner
(74) *Attorney, Agent, or Firm* — Cowan, Liebowitz & Latman, P.C.

(57) ABSTRACT

Three pieces of candidate position information are calculated based on a plurality of pieces of sensing position information, and three pieces of candidate orientation information are calculated based on a plurality of pieces of sensing orientation information. Sets each of which combines one candidate position information and one candidate orientation information are prepared for all combinations. For each set, the candidate position information and candidate orientation information which configure that set are corrected. An evaluation value is calculated for each corrected set, and one of the sets is selected based on the calculated evaluation values. The candidate position information and candidate orientation information which configure the selected set are respectively recorded in a memory as sensing position information and sensing orientation information.

11 Claims, 15 Drawing Sheets

OTHER PUBLICATIONS

Fusing Points and Lines for High Performance Tracking, Edward Rosten and Tom Drummond, 2005, English Abstract.

Real-Time Camera Tracking Using Known 3D Models and a Particle Filter, Mark Pupilli and Andrew Calway, 2006, English Abstract.

Full-3D Edge Tracking with a Particle Filter, Georg Kkein and David Murray, 2006, English Abstract.

Scene Modelling, Recognition and Tracking with Invariant Image Features, Iryna Gordon and David G. Lowe, 2004, English Abstract.

Adaptive Line Tracking with Multiple Hypotheses for Augmented Reality, Haral Wuest, Florent Via and, Didier Strecker, 2005, English Abstract.

Robust Vision-Based Registration Utilizing Bird's-Eye View with User's View, Kiyohide Satoh, Shinji Uchiyama, Hiroyuki Yamamoto and Hideyuki Tamura, 2003, English Abstract.

* cited by examiner

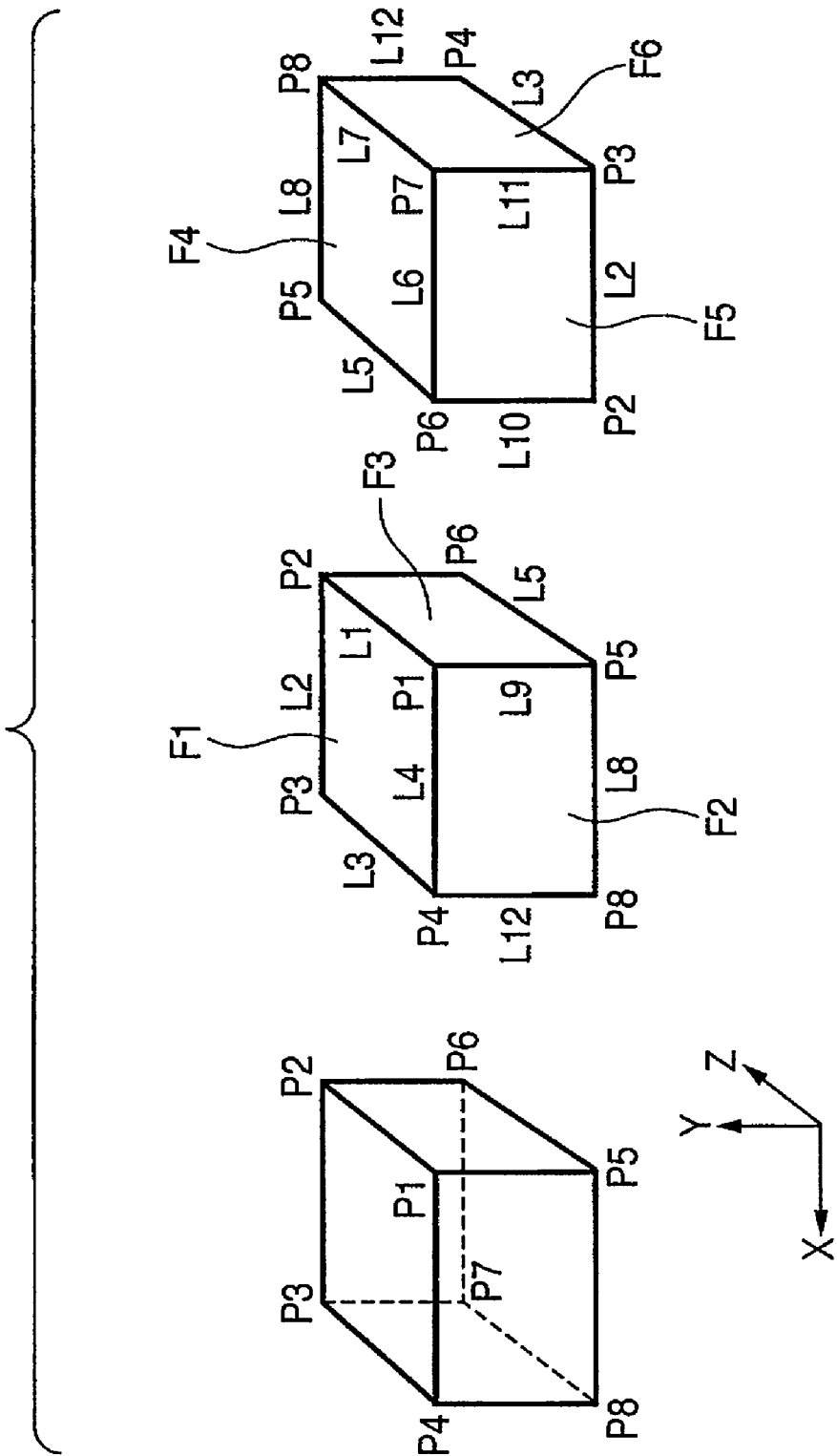

FIG. 3B

| POINT | X | Y | Z |
|---|---|---|---|
| P1 | 0 | 200 | 0 |
| P2 | 0 | 200 | 250 |
| P3 | 250 | 200 | 250 |
| P4 | 250 | 200 | 0 |
| P5 | 0 | 0 | 0 |
| P6 | 0 | 0 | 250 |
| P7 | 250 | 0 | 250 |
| P8 | 250 | 0 | 0 |

FIG. 3C

| PLANE | CONFIGURING POINTS AND ORDER |
|---|---|
| F1 | P1-P2-P3-P4 |
| F2 | P1-P4-P8-P5 |
| F3 | P1-P2-P6-P5 |
| F4 | P5-P6-P7-P8 |
| F5 | P2-P3-P7-P6 |
| F6 | P3-P4-P8-P7 |

FIG. 3D

| LINE | TWO POINTS AT TWO ENDS |
|---|---|
| L1 | P1-P2 |
| L2 | P2-P3 |
| L3 | P3-P4 |
| L4 | P4-P1 |
| L5 | P5-P6 |
| L6 | P6-P7 |
| L7 | P7-P8 |
| L8 | P8-P5 |
| L9 | P1-P5 |
| L10 | P2-P6 |
| L11 | P3-P7 |
| L12 | P4-P8 |

F I G. 12
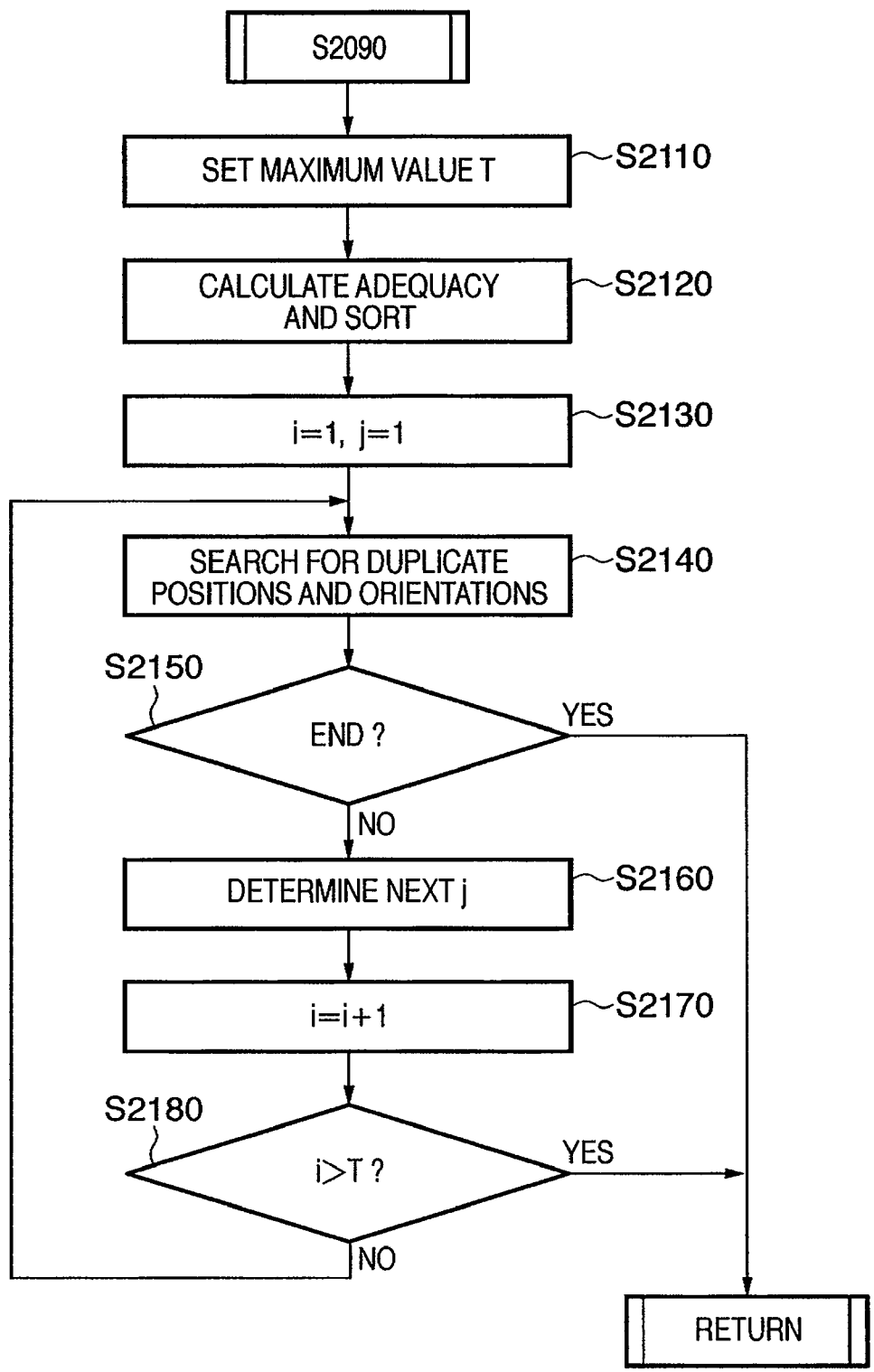

F I G. 14
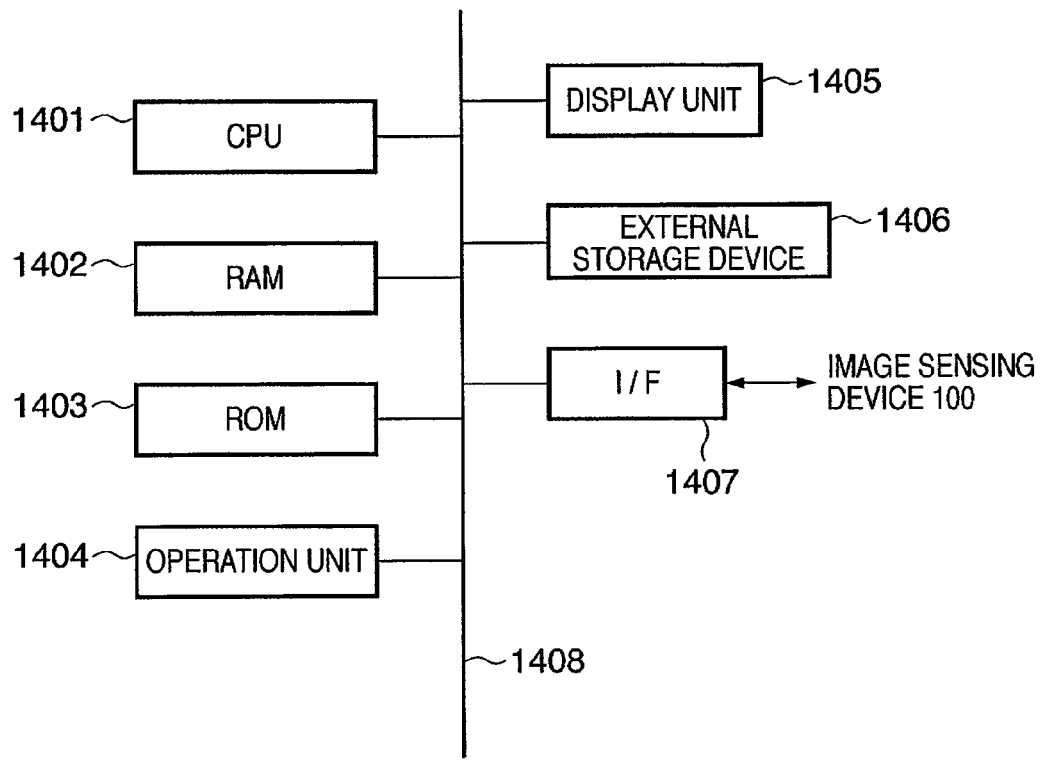

INFORMATION PROCESSING APPARATUS AND METHOD FOR CALCULATING THE POSITION AND ORIENTATION OF AN IMAGE SENSING DEVICE

BACKGROUND OF THE INVENTION

1. Field of the Invention

The present invention relates to a technique for calculating the position and orientation of an image sensing device.

2. Description of the Related Art

In recent years, studies about an Augmented Reality (to be abbreviated as AR hereinafter) technique, which superimposes information of a virtual space in a physical space and presents a composite image to the user, have been extensively made. As an information presentation apparatus in the AR technique, a video see-through head mounted display (to be abbreviated as HMD hereinafter) is typically used. The video see-through HMD incorporates a camera which senses an image of the physical space. On the other hand, virtual objects are rendered by computer graphics (to be abbreviated as CG hereinafter) in accordance with the position and orientation of this camera in the physical space. A composite image is generated by superimposing the rendered virtual objects on the image of the physical space, and is displayed on a display device such as a liquid crystal panel or the like of the HMD. With this information presentation apparatus, the user can feel as if the virtual objects exist in the physical space.

As one of major problems to be solved upon implementing the AR technique, a problem about registration is known. In order to make the user feel as if virtual objects exist in the physical space, geometrical matching between the virtual objects and physical space needs to be assured. That is, the virtual objects must be observed from the user as if they exist at positions where they should exist in the physical space.

In the AR technique using the video see-through HMD, every time the image of the physical space is acquired from the camera incorporated in the HMD, the position and orientation of the camera in the physical space upon image sensing are measured. A CG is rendered based on the position and orientation of the camera and camera specific parameters such as a focal length and the like, and is superimposed on the image of the physical space. Such series of processes are generally executed in the AR technique. For this reason, in case of the AR technique using the video see-through HMD, the problem about registration is reduced to a problem of measuring the position and orientation of the camera incorporated in the HMD in the physical space. The position and orientation of the camera can be measured by a physical sensor such as a magnetic sensor, ultrasonic sensor, optical sensor, or the like, which measures the six degrees of freedom of the position and orientation of the camera.

When the video see-through HMD is used, image information from the camera incorporated in the HMD can be used for registration. A registration method using image information is popularly used since it is simpler and has lower cost than the method of using the physical sensor. In the registration method using image information, indices whose three-dimensional positions on the physical space are known are sensed by the camera, and the position and orientation of the camera are calculated based on correspondence between the positions of the indices on the sensed image and their three-dimensional positions.

As such indices, markers which are artificially placed on the physical space or natural features such as corner points, edges, and the like which originally exist on the physical space are used. In practice, artificial markers which can be easily detected and identified from an image are prevalently used in terms of stability and a load on calculations.

Non-parent reference 1 discloses a registration method which uses, as indices, square markers in each of which a unique two-dimensional (2D) pattern is drawn. With this method, a region of a square index is extracted from an image, and a marker is identified using the inner 2D pattern. Furthermore, the position and orientation of the camera are calculated based on correspondence between the positions of respective vertices of the square marker on an image sensed by the camera, and the positions of the vertices on a marker coordinate system of the square marker. Artificial markers such as these square markers and the like are popularly used since they can be readily used. However, such markers cannot be used when it is impossible to physically allocate markers or when markers are not wanted to be allocated due to disfigurement or the like.

On the other hand, studies about registration methods using natural features which originally exist on the physical space have been extensively made due to recent improvement of the capability of computers. As natural features used for registration, point-shaped features (to be referred to as point features hereinafter) such as corner points and the like, and line features such as edges and the like are mainly used.

Non-parent references 2, 3, 4, 5, 6, and 7 disclose registration methods using edges. Since edges never change with respect to scales and observation directions, the registration using edges assures high precision as a characteristic feature. The registration using edges is based on the premise of having three-dimensional (3D) model data of a physical space or physical object, which is described by a set of line segments. The registration using edges disclosed in non-patent references 2, 3, and 4 is implemented by the following processes 1 to 3.

1. The aforementioned 3D model data (line segment model) is projected onto an image based on the position and orientation of the camera in a previous frame and camera specific parameters which have already been calibrated.

2. Line segments which configure the projected line segment model are divided at given intervals on the image, thus setting division points. An edge search is conducted on a line segment (search line) which passes through each division point and has a direction normal to the projected line segment to detect, as a corresponding edge, a point which has a local maximum gradient of a luminance value on the search line and is closest to the division point.

3. Correction values of the position and orientation of the camera, which minimize the sum total of distances on the image between the corresponding edges detected for respective division points and projected line segments, are calculated, thereby correcting the position and orientation of the camera.

The aforementioned registration method using edges performs edge detection based on the position and orientation of the camera calculated in the previous frame. Then, correction values for the position and orientation of the previous frame are calculated based on the information of the edge detected on the image, and the position and orientation of the camera in the previous frame are corrected using the correction value, thereby calculating the position and orientation of the camera in the current frame. For this reason, for example, when the position and orientation calculations in the previous frame have failed, the position and orientation of the camera can no longer be correctly calculated in the subsequent frames, thus collapsing the registration. Such situation often occurs when the camera moves at high speed or when a moving object cuts across in front of the camera, and so forth. In order to avoid the registration from collapsing, a method of outputting the positions and orientations of a plurality of cameras in each frame in place of those of a single camera, and using them in the next frame as a plurality of hypotheses, has been proposed.

Non-parent reference 5 avoids the registration using edges from collapsing by using point feature information together and calculating the positions and orientations of a plurality of cameras per frame. Non-parent reference 5 calculates the positions and orientations of the camera in the current frame by iterative operations based on correspondence of point features between frames together with the registration using edges. In this case, the position and orientation of the camera obtained from edge information in the previous frame, and those of the camera obtained from the point feature information are used as initial values, thus calculating the positions and orientations of two types of cameras. The position and orientation which have a larger likelihood of those of the two types of cameras calculated in this way, are determined as those of the camera obtained from the point feature information. Then, the determined position and orientation of the camera are output to the next frame as one hypothesis, and are set as initial values of the position and orientation of the camera in the registration using edges. Furthermore, the aforementioned registration using edges is executed, and the position and orientation of the camera as a result of the registration are output to the next frame as another hypothesis. In this way, non-patent reference 5 always output the positions and orientations of the two cameras to the next frame, and the position and orientation with higher validity are always selected, thus avoiding the registration from collapsing.

Non-patent references 6 and 7 avoid the registration using edges from collapsing by holding the positions and orientations of a plurality of cameras by a particle filter. The particle filter holds the positions and orientations of the plurality of cameras as a set of discrete particles in a six-dimensional space. Each particle has a weight representing the reliability of the position and orientation of the camera as data together with the position and orientation of the camera. In each frame, a new set of particles based on the weights of respective particles are generated from a set of particles obtained from the previous frame. The positions and orientations of the newly generated particles are changed based on a motion model. Furthermore, likelihoods are calculated for respective particles, and a set of particles, which are weighted according to the calculated likelihoods, is output to the next frame as the positions and orientations of the plurality of cameras. As the position and orientation of the camera in the current frame, the weighted averages of the positions and orientations of respective particles are generally used. In this manner, non-patent references 6 and 7 avoid the collapse of registration using edges by holding the positions and orientations of the plurality of cameras as particles.

[Non-Patent Reference 1]

Kato, M. Billinghurst, Asano, and Tachibana, "Augmented Reality System and its Calibration based on Marker Tracking", the Journal of the Virtual Reality Society of Japan, vol. 4, no. 4, pp. 607-617, 1999.

[Non-Patent Reference 2]

T. Drummond and R. Cipolla, "Real-time visual tracking of complex structures," IEEE Transactions on Pattern Analysis and Machine Intelligence, vol. 24, no. 7, pp. 932-946, 2002.

[Non-Patent Reference 3]

A. I. Comport, E. Marchand, and F. Chaumette, "A real-time tracker for markerless augmented reality," Proc. The 2nd IEEE/ACM International Symposium on Mixed and Augmented Reality (ISMAR03), pp. 36-45, 2003.

[Non-Patent Reference 4]

L. Vacchetti, V. Lepetit, and P. Fua, "Combining edge and texture information for real-time accurate 3D camera tracking," Proc. The 3rd IEEE/ACM International Symposium on Mixed and Augmented Reality (ISMAR04), pp. 48-57, 2004.

[Non-Patent Reference 5]

E. Rosten and T. Drummond, "Fusing points and lines for high performance tracking," Proc. The 10th IEEE International Conference on Computer Vision (ICCV'05), pp. 1508-1515, 2005.

[Non-Patent Reference 6]

M. Pupilli and A. Calway, "Real-time camera tracking using known 3D models and a particle filter," Proc. The 18th International Conference on Pattern Recognition (ICPR'06), pp. 199-203, 2006.

[Non-Patent Reference 7]

G. Klein and D. Murray, "Full-3D edge tracking with a particle filter," Proc. British Machine Vision Conference 2006, 2006.

[Non-Patent Reference 8]

I. Skrypnyk and D. G. Lowe, "Scene modelling, recognition and tracking with invariant image features," Proc. The 3rd IEEE/ACM International Symposium on Mixed and Augmented Reality (ISMAR04), pp. 110-119, 2004.

[Non-Patent Reference 9]

W. Wuest, F. Vial, and D. Stricker, "Adaptive line tracking with multiple hypotheses for augmented reality," Proc. The Fourth Int'l Symp. on Mixed and Augmented Reality (ISMAR05), pp. 62-69, 2005.

[Non-Patent Reference 10]

K. Satoh, S. Uchiyama, H. Yamamoto, and H. Tamura, "Robust vision-based registration utilizing bird's-eye view with user's view," Proc. The Second Int'l Symp. on Mixed and Augmented Reality (ISMAR03), pp. 46-55, 2003.

A scheme disclosed in non-patent reference 5 generates the positions and orientations of a plurality of cameras using point feature information so as to avoid the registration from collapsing. If there are no or a few point features such as corner points or the like on the physical space, or if there are many point features having similar appearances, the scheme disclosed in non-patent reference 5 cannot be applied. Also, which of two sets of positions and orientations of the cameras are to be used is determined only in the next frame. Hence, upon rendering a virtual object in the AR technique, the correct position and orientation of the camera cannot always be used.

Since the scheme disclosed in non-patent references 6 and 7 requires calculations of likelihoods for several hundreds of particles, the calculation load is heavy. For this reason, this scheme is not suitable for an AR application which requires realtimeness. With the scheme using the particle filter, since the position and orientation of the camera are expressed as a set of particles, the obtained position and orientation of the camera are often inaccurate, and jitter is produced between frames.

SUMMARY OF THE INVENTION

The present invention has been made in consideration of the aforementioned problems, and has as its object to provide a technique for easily and accurately calculating the position and orientation of an image sensing device while avoiding "collapse of registration" that may occur upon calculating the position and orientation of the image sensing device on the physical space.

According to one aspect of the present invention, an information processing apparatus connected to an image sensing device which senses a movie of a physical space, comprises:

calculation means for calculating a plurality of pieces of candidate position and orientation information based on a plurality of pieces of sensing position and orientation information stored in a memory as candidates of a sensing position and a sensing orientation of the image sensing device upon sensing an image of each frame for respective frames which form the movie;

evaluation means for calculating evaluation values for the plurality of pieces of candidate position and orientation information;

selection means for selecting one candidate position and orientation information based on the evaluation values from the plurality of pieces of candidate position and orientation information; and recording means for recording the candidate position and orientation information selected by the selection means in the memory as the sensing position and orientation information.

According to another aspect of the present invention, an information processing method to be executed by an information processing apparatus, which is connected to an image sensing device which senses a movie of a physical space, comprises:

a calculation step of calculating a plurality of pieces of candidate position and orientation information based on a plurality of pieces of sensing position and orientation information stored in a memory as candidates of a sensing position and a sensing orientation of the image sensing device upon sensing an image of each frame for respective frames which form the movie;

an evaluation step of calculating evaluation values for the plurality of pieces of candidate position and orientation information;

a selection step of selecting one candidate position and orientation information based on the evaluation values from the plurality of pieces of candidate position and orientation information; and a recording step of recording the candidate position and orientation information selected in the selection step in the memory as the sensing position and orientation information.

Further features of the present invention will become apparent from the following description of exemplary embodiments with reference to the attached drawings.

BRIEF DESCRIPTION OF THE DRAWINGS

FIGS. 3A to 3D are views for explaining a 3D model definition method according to the first embodiment of the present invention;

FIG. 12 is a flowchart showing details of the process in step S2090;

FIG. 14 is a block diagram showing an example of the hardware arrangement of a computer which is applicable to the position and orientation measuring apparatuses 1 and 2.

DESCRIPTION OF THE EMBODIMENTS

Preferred embodiments of the present invention will be described in detail hereinafter with reference to the accompanying drawings. Note that the arrangements presented in the following embodiments are merely examples, and the present invention is not limited to the illustrated arrangements.

First Embodiment

Figure 1:
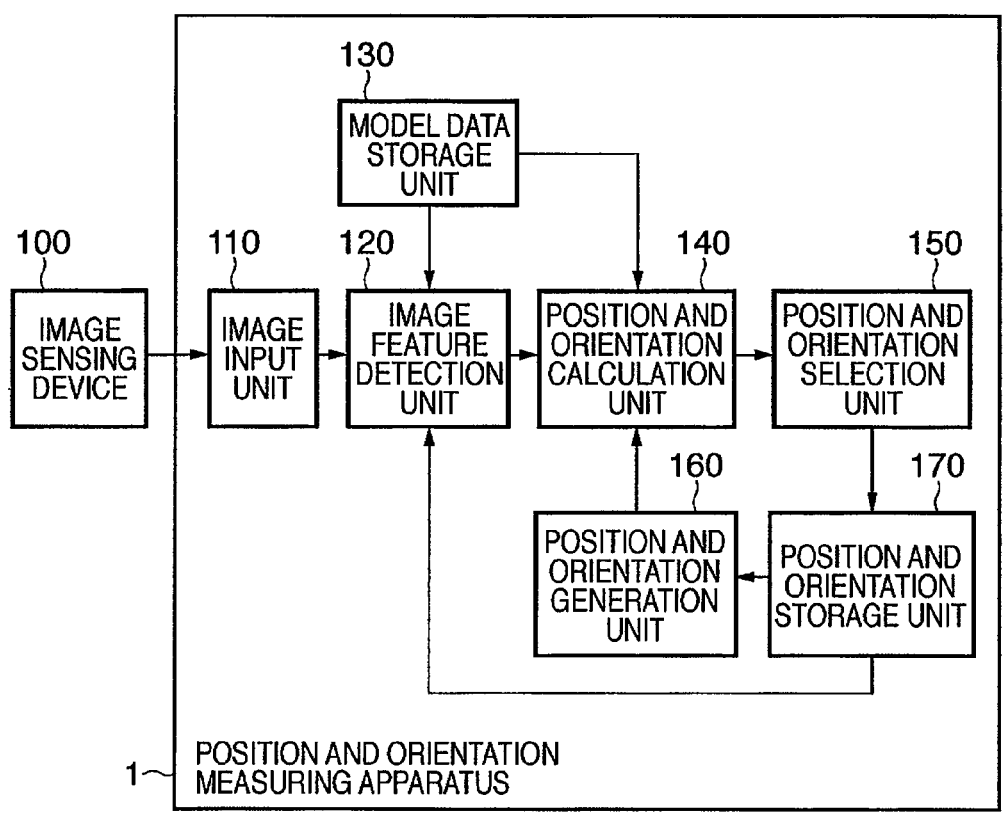
FIG. 1 is a block diagram showing the functional arrangement of a position and orientation measuring apparatus 1 according to the first embodiment of the present invention.

FIG. 1 is a block diagram showing the functional arrangement of a position and orientation measuring apparatus 1 according to this embodiment. As shown in FIG. 1, the position and orientation measuring apparatus 1 comprises an image input unit 110, image feature detection unit 120, model data storage unit 130, position and orientation calculation unit 140, position and orientation selection unit 150, position and orientation generation unit 160, and position and orientation storage unit 170. An image sensing device 100 is connected to the image input unit 110.

Figure 2:
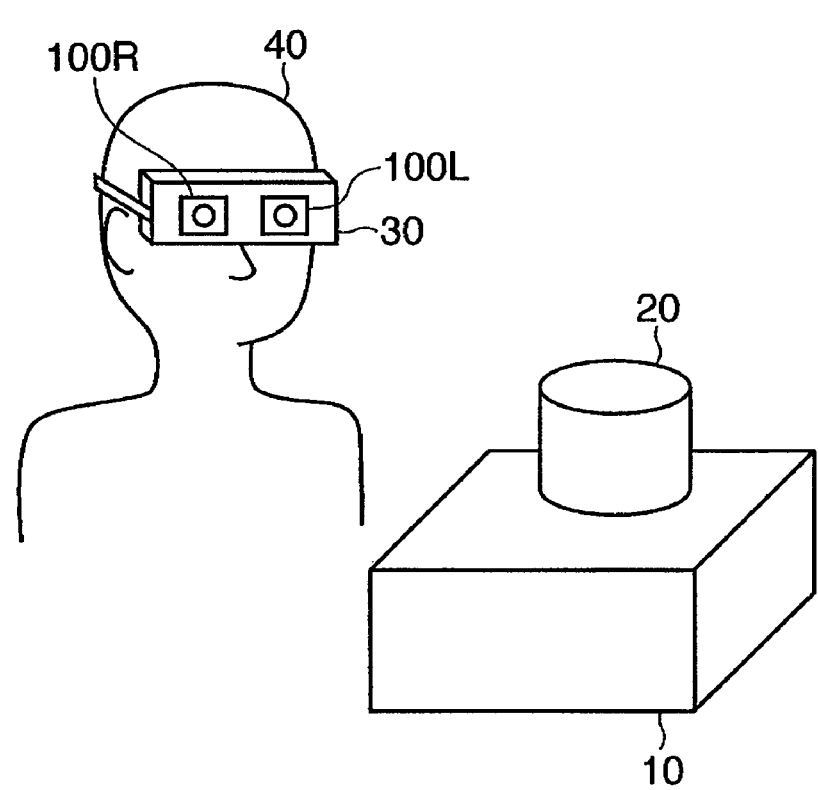
FIG. 2 illustrates a user who wears image sensing devices 100R and 100L, and a space observed by this user.

FIG. 2 illustrates a user who wears the image sensing devices 100 and a space to be observed by this user.

An observer 40 wears a video see-through HMD 30. The video see-through HMD 30 incorporates image sensing devices 100R and 100L corresponding to the right and left eyes. The image sensing devices 100R and 100L respective sense movies of the physical space. In FIG. 2, the image sensing devices 100R and 100L sense movies of the physical space including an object 10 to be observed as a physical object. Images of respective frames sensed by the image sensing device 100L or 100R are sequentially input to the position and orientation measuring apparatus 1. The position and orientation measuring apparatus 1 calculates the position and orientation of the image sensing device 100L or 100R based on the images input from the image sensing device 100L or 100R and 3D model data of the object 10 to be observed stored in the model data storage unit 130.

The position and orientation measuring apparatus 1 generates a composite image by rendering an image of a virtual object 20 based on the calculated position and orientation of the image sensing device 100L or 100R to be superimposed on the image of the frame used for this calculation. The position and orientation measuring apparatus 1 outputs the generated composite image to a display device of the video see-through HMD 30. Hence, the display device displays the composite image. Assume that the display device of the video see-through HMD 30 is attached to the video see-through HMD 30 to be located in front of the eyes of the observer 40 who wears the video see-through HMD 30. Therefore, this composite image is displayed in front of the eyes of the observer 40.

Note that the aforementioned position and orientation calculation processing may be executed using images sensed by the image sensing device 100R in addition to those sensed by the image sensing device 100L. In this embodiment, assume that the position and orientation of the image sensing device 100L corresponding to the viewpoint of the observer (the position and orientation of the observer) are calculated using only images sensed by the image sensing device 100L.

Respective units which configure the position and orientation measuring apparatus 1 will be described below.

The image input unit 110 receives images of respective frames sequentially output from the image sensing device 100L, and transfers them to the following image feature detection unit 120. The image input unit 110 is implemented by an analog video capture board if the output from the image sensing device 100L is an analog output of, for example, NTSC. The image input unit 110 is implemented by, for example, an IEEE1394 interface board if the output from the image sensing device 100L is a digital output of IEEE1394 or the like. When a movie file of the physical space is stored in advance in, for example, a hard disk drive or the like, and the position and orientation measuring apparatus 1 uses this file, the image input unit 110 executes processing for reading out this file and transferring the readout file to the following image feature detection unit 120.

Upon reception of an image from the image input unit 110, the image feature detection unit 120 detects image features used to calculate the position and orientation of the image sensing device 100L from this image. In this embodiment, assume that the image feature detection unit 120 detects edges on the image. The edge detection method will be described later.

The model data storage unit 130 stores 3D model data of the object 10 to be observed, which serves as a reference upon calculating the position and orientation of the image sensing device 100L.

FIGS. 3A to 3D are views for explaining the definition method of a 3D model according to this embodiment. A 3D model is defined by information of vertices, information of planes each configured by coupling respective vertices, and information of line segments which configure each plane. As shown in a left figure of FIG. 3A, the 3D model of this embodiment is a rectangular parallelepiped configured by eight points P1 to P8. An X-axis of a coordinate system of the rectangular parallelepiped is defined in a direction from the point P1 to the point P4, a Y-axis is defined in a direction from the point P5 to the point P1, and a Z-axis is defined in a direction from the point P1 to the point P2. An origin is defined at the point P5. As shown in central and left figures of FIG. 3A, the rectangular parallelepiped is configured by planes F1 to F6, and is also configured by line segments L1 to L12.

As shown in FIG. 3B, the points P1 to P8 are expressed by 3D coordinate values. As shown in FIG. 3C, each of the planes F1 to F6 is expressed by the IDs of the points which configure the corresponding plane, and the order of connecting the respective points. As shown in FIG. 3D, each of the line segments L1 to L14 is expressed by the IDs of the points of the two ends.

Therefore, in this embodiment, assume that the model data storage unit 130 stores, as 3D model data, data which can reproduce the 3D model of the object 10 to be observed, that is, data of the tables shown in FIGS. 3B, 3C, and 3D. However, various expression methods of 3D model data are available, and the following description is not limited to the use of 3D model data according to a specific expression method.

The position and orientation storage unit 170 stores the positions and orientations of the image sensing device 100L, which are calculated by the position and orientation calculation unit 140 for images for several past frames (images for three frames before the current frame). In other words, the position and orientation storage unit 170 stores the positions and orientations of the image sensing device 100L at the time of sensing images for several past frames (e.g., images for three frames before the current frame). Strictly speaking, the unit 170 stores "position information indicating each position and orientation information indicating each orientation". In this way, in the following description, "storing a position" intends "storing position information indicating a position", and "storing an orientation" intends "storing orientation information indicating an orientation".

In this embodiment, assume that the position and orientation storage unit 170 stores the position and orientation of the image sensing device 100L, which were calculated by the position and orientation calculation unit 140 using the immediately preceding frame, those of the image sensing device 100L, which were calculated by the position and orientation calculation unit 140 using the second preceding frame, and those of the image sensing device 100L, which were calculated by the position and orientation calculation unit 140 using the third preceding frame.

Before the position and orientation of the image sensing device 100L, which are calculated using an image of an initial frame (e.g., an image of the first frame) are stored in the position and orientation storage unit 170, the position and orientation storage unit 170 stores the initial position and orientation of the image sensing device 100L, which are obtained from initialization processing to be described later.

The position and orientation generation unit 160 generates a plurality of positions and orientations using those stored in the position and orientation storage unit 170.

The position and orientation calculation unit 140 uses the respective positions and orientations generated by the position and orientation generation unit 160 as initial values required to make iterative operations, and calculates a plurality of positions and orientations from the respective initial values. More specifically, the unit 140 calculates the positions and orientations of the image sensing device 100L on a coordinate system with reference to the object 10 to be observed (to be referred to as a reference coordinate system hereinafter) based on the information of image features detected by the image feature detection unit 120 and the model data stored in the model data storage unit 130.

The position and orientation selection unit 150 selects the most adequate position and orientation from the plurality of positions and orientations calculated by the position and orientation calculation unit 140, and stores them in the position and orientation storage unit 170. Note that an image of the virtual object 20 is rendered using the position and orientation selected by the position and orientation selection unit 150.

Note that FIG. 1 shows only the arrangement required to calculate the position and orientation of the image sensing device 100L, but it does not show any arrangement required to generate an image of the virtual object using the position and orientation, to composite it with a physical space image, and to output the composite image to the HMD or the like. However, the calculated position and orientation of the image sensing device 100L may be used for any purpose.

The processing for calculating the position and orientation of the image sensing device 100L, which is executed by the position and orientation measuring apparatus 1, will be described below with reference to FIG. 4 which shows the flowchart of that processing.

(Step S1010)

In step S1010, the position and orientation measuring apparatus 1 stores, in the position and orientation storage unit 170, initial position information indicating an initial position and initial orientation information indicating an initial orientation of the image sensing device 100L.

In this step, the apparatus 1 sets (initializes) an approximate position and orientation of the image sensing device 100L on the reference coordinate system. The position and orientation measuring method of this embodiment sequentially updates the approximate position and orientation of the image sensing device 100L using edge information on images. For this reason, the approximate position and orientation of the image sensing device 100L must be given in advance as the initial position and orientation prior to the start of position and orientation measurement. For this purpose, for example, initialization is executed by setting a predetermined position and orientation and moving the image sensing device 100L to the predetermined position and orientation. As described in non-patent reference 1, an artificial index which is recognizable by detecting it in an image may be allocated, and the position and orientation of the image sensing device 100L may be calculated based on correspondence between the image coordinates of respective vertices of the index and their 3D positions on the reference coordinate system, so as to obtain the approximate position and orientation. As described in non-patent reference 8, a highly identifiable natural feature point may be detected in advance to calculate its 3D position, and that feature point may be detected on an image at the time of initialization, so as to calculate the position and orientation of the image sensing device 100L based on correspondence between these image coordinates and 3D position. Furthermore, the position and orientation of the image sensing device 100L may be measured using a six-degrees-of-freedom position and orientation sensor such as a magnetic sensor, optical sensor, ultrasonic sensor, or the like, and they may be used as the approximate position and orientation. Furthermore, initialization may be executed using the position and orientation of the image sensing device 100L measured using image information of an artificial index, natural feature, or the like, and the aforementioned six-degrees-of-freedom position and orientation sensor or a three-degrees-of-freedom orientation sensor and three-degrees-of-freedom position sensor in combination.

As a result of such initialization, since the initial position and orientation of the image sensing device 100L can be obtained, initial position information indicating the obtained initial position, and initial orientation information indicating the obtained initial orientation are stored in the position and orientation storage unit 170. The process then advances to step S1020.

(Step S1020)

In step S1020, the image input unit 110 acquires data of an image (physical space image) sensed by the image sensing device 100L, and transfers it to the following image feature detection unit 120.

(Step S1030)

In step S1030, the image feature detection unit 120 executes detection processing of image features from the physical space image received from the image input unit 110.

Figure 5:
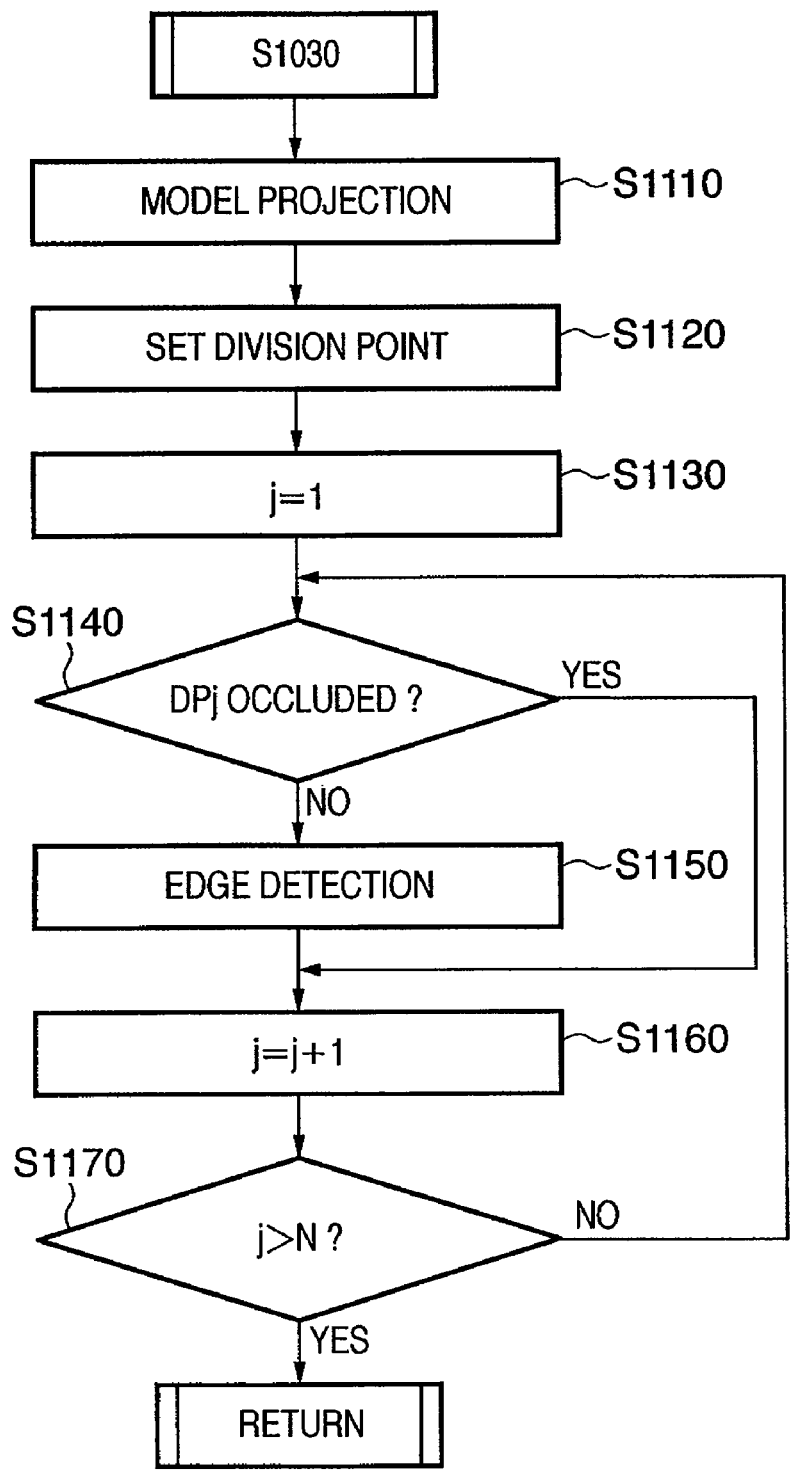
FIG. 5 is a flowchart showing details of the process in step S1030.

In this embodiment, assume that image features are edges. FIG. 5 is a flowchart showing details of the process in step S1030.

In step S1110, the image feature detection unit 120 executes model projection. In the model projection, the unit 120 generates the 3D model of the object 10 to be observed based on the 3D model data stored in the model data storage unit 130 first. The unit 120 then projects the generated 3D model onto the physical space image based on the latest position and orientation stored in the position and orientation storage unit 170.

More specifically, the model projection is to calculate an equation of a straight line of each line segment on the physical space image upon projecting each of line segments which express the 3D model onto the physical space image. The equation of a straight line is calculated as that of a straight line which passes through the two ends of each line segment on the physical space image by projecting them onto the physical space image. In order to implement the model projection, specific parameters of the image sensing device 100L such as a focal length, principal point position, and the like need to be known in addition to the position and orientation of the image sensing device 100L. A description of this embodiment will be given under the assumption that the specific parameters of the image sensing device 100L such as the focal length, principal point position, and the like are measured in advance, and are held by the image feature detection unit 120 as data.

Figure 6A:
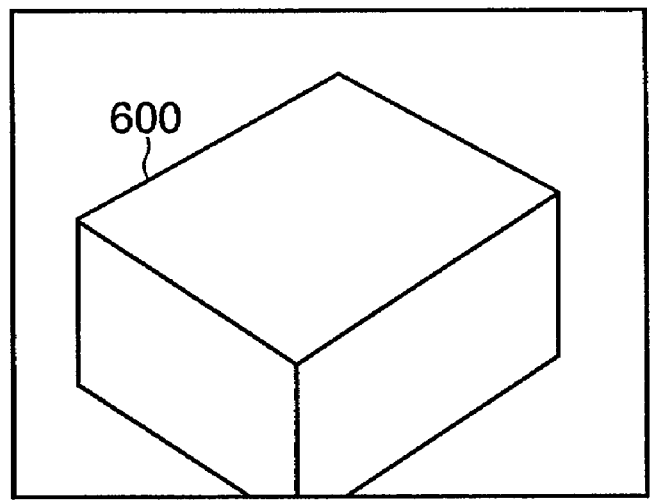
FIGS. 6A and 6B are views showing projection of a 3D model onto a physical space image, which is executed in step S1110.
Figure 6B:
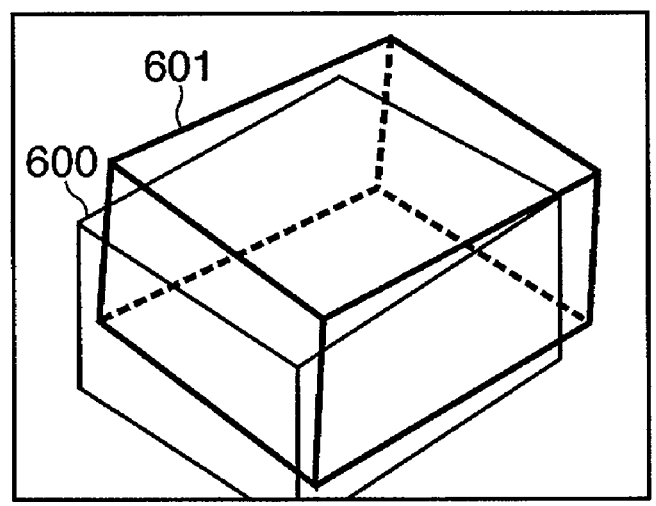

FIGS. 6A and 6B show the projection of a 3D model onto the physical space image in step S1110. FIG. 6A shows the physical space image itself, and reference numeral 600 denotes an image of the object 10 to be observed. FIG. 6B shows the physical space image on which the 3D model is projected, and reference numeral 601 denotes an image of the projected 3D model.

When the latest position and orientation stored in the position and orientation storage unit 170 are different from the current actual position and orientation of the image sensing device 100L, the actually sensed image 600 deviates from the image 601 of the projected 3D model, as shown in FIG. 6B. In FIG. 6B, line segments indicated by the broken lines are those which are occluded and cannot be seen in practice of the line segments which configure the 3D model.

Figure 7:
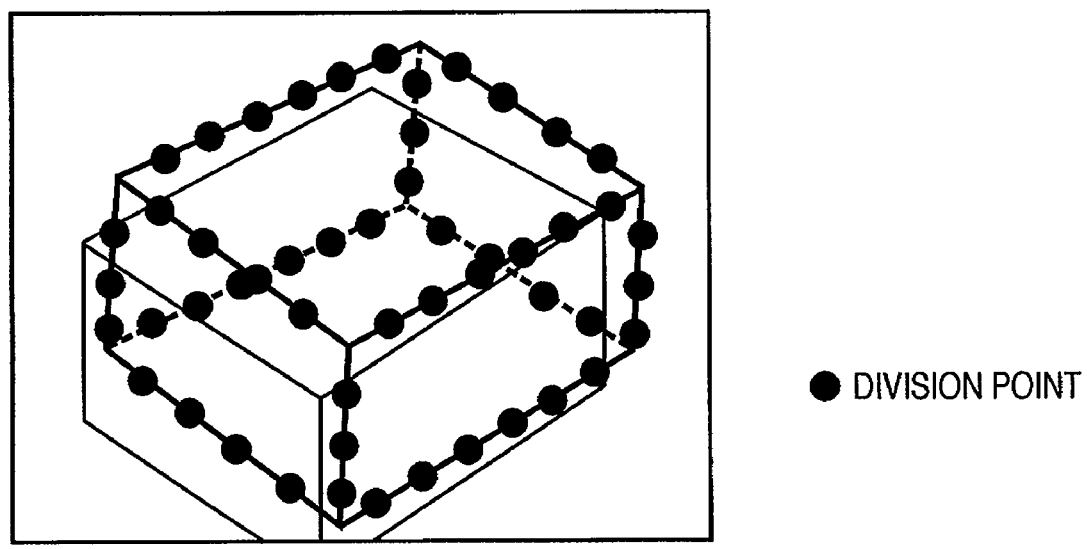
FIG. 7 shows division points of the 3D model on the physical space image.

In step S1120, the image feature detection unit 120 sets division points. The unit 120 sets division points to divide the projected line segments on the physical space image at equal intervals using the equations of the respective line segments calculated in step S1110. FIG. 7 shows the division points of the 3D model on the physical space image. Let N be the total number of division points, and DPj (j=1, 2, . . . , N) be each division point. A longer processing time is required with increasing the number N of division points. For this reason, by changing the interval between neighboring division points on the physical space image, the processing time can be controlled. Also, the interval between neighboring division points on the physical space image may be sequentially changed to assure a constant processing time while the number of division points remains the same.

In step S1130, the image feature detection unit 120 initializes a variable j to 1.

The image feature detection unit 120 checks in step S1140 if the division point DPj is occluded. More specifically, if the division point DPj is occluded by another plane of the 3D model, that is, if it is a division point on the broken line in FIG. 7, the division point DPj is occluded. Whether or not the division point DPj is visible can be determined in such a manner that after the aforementioned 3D model is rendered using graphics hardware, the division point is then rendered, and the graphics hardware confirms if a depth buffer is updated, as described in, for example, non-patent reference 9. If the division point DPj is occluded, the process jumps to step S1160; otherwise, the process advances to step S1150.

Figure 8A:
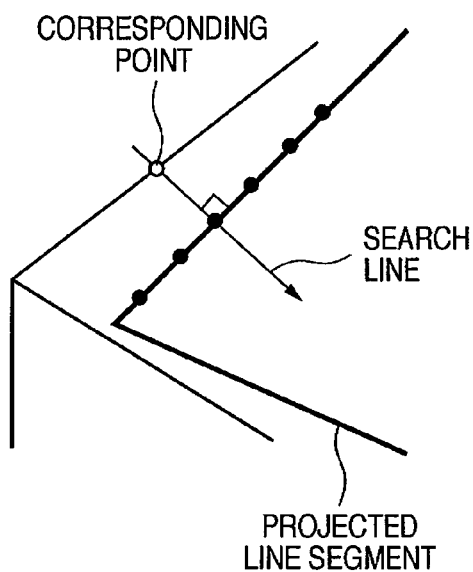
FIGS. 8A and 8B are views for explaining an edge detection method according to the first embodiment of the present invention.
Figure 8B:
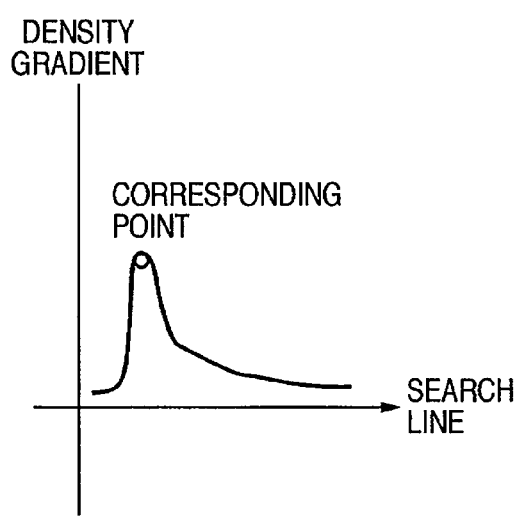

In step S1150, the image feature detection unit 120 detects an edge corresponding to the division point DPj. FIGS. 8A and 8B are views for explaining an edge detection method of this embodiment. As shown in FIG. 8A, a linear search of an edge is conducted for each division point on a line segment (to be referred to as a search line hereinafter) which is parallel to a direction normal to the projected line segment and passes through the division point. An edge exists at a position where a density gradient assumes a local maximum value on the search line (see FIG. 8B). In this embodiment, when a plurality of edges are detected on the search line, an edge closest to the division point on the physical space image is determined as a corresponding point. However, the method of determining the corresponding point is not limited to this, and an edge where the density gradient assumes a maximum absolute value of the local maximum value may be determined as a corresponding point.

In step S1160, the image feature detection unit 120 increments the value held by the variable j by one.

If the image feature detection unit 120 determines in step S1170 that the processes for all division points DPj are complete (if j>N), it ends this processing, and the control returns to step S1031. On the other hand, if the processes for all division points DPj are not complete yet (if j≧N), the process returns to step S1140 to execute the subsequent processes.

In this manner, the image feature detection unit 120 detects image features from the physical space image.

(Step S1031)

The position and orientation calculation unit 140 checks in step S1031 if the position information and orientation information for three frames are stored in the position and orientation storage unit 170. The unit 140 checks if the position and orientation of the image sensing device 100L for the immediately preceding frame, those of the image sensing device 100L for the second preceding frame, and those of the image sensing device 100L for the third preceding frame are stored in the position and orientation storage unit 170. As a result of this checking, if these positions and orientations are stored in the position and orientation storage unit 170, the process advances to step S1040; otherwise, the process advances to step S1032.

(Step S1040)

In step S1040, the position and orientation generation unit 160 calculates a plurality of pieces of position information (candidate position information) $p_i$ (i=1, 2, . . . , I) using the position information ($p_{org}^{t-1}$, $p_{org}^{t-2}$, $p_{org}^{t-3}$) stored in the position and orientation storage unit 170. The position and orientation generation unit 160 calculates a plurality of pieces of orientation information (candidate orientation information) $q_i$ (i=1, 2, . . . , I) using the orientation information ($q_{org}^{t-1}$, $q_{org}^{t-2}$, $q_{org}^{t-3}$) stored in the position and orientation storage unit 170.

Note that $p_{org}$ and $p_i$ are 3D vectors which represent the positions of the image sensing device 100L on a 3D space, and $q_{org}$ and $q_i$ are quaternions which represent the orientations of the image sensing device 100L.

Also, $p_{org}^{t-1}$, $p_{org}^{t-2}$, and $p_{org}^{t-3}$ are the three pieces of position information of the image sensing device 100L which are stored in the position and orientation storage unit 170 in correspondence with the immediately preceding frame, second preceding frame, and third preceding frame. Furthermore, $q_{org}^{t-1}$, $q_{org}^{t-2}$, and $q_{org}^{t-3}$ are the three pieces of orientation information which are stored in the position and orientation storage unit 170 in correspondence with the immediately preceding frame, second preceding frame, and third preceding frame.

The numbers (I) of pieces of position information and orientation information to be generated based on the position information and orientation information stored in the position and orientation storage unit 170 match those of models determined in advance as motion models of the image sensing device 100L. In this embodiment, as position motion models of the image sensing device 100L, three models, that is, a position static model, uniform velocity motion model, and uniform acceleration motion model are assumed. Also, as orientation motion models of the image sensing device 100L, three models, that is, an orientation static model, uniform velocity motion model, and uniform acceleration motion model are assumed. Therefore, I=3.

That is, the three pieces of position information to be generated respectively correspond to the position static model, uniform velocity motion model, and uniform acceleration motion model. Therefore, position information $p_1$ corresponds to the position static model, position information $p_2$ corresponds to the uniform velocity motion model, and position information $p_3$ corresponds to the uniform acceleration motion model.

$p_1$, $p_2$, and $p_3$ are respectively calculated by:

$$p_1 = p_{org}^{t-1} \tag{1}$$

$$p_2 = 2p_{org}^{t-1} - p_{org}^{t-2} \tag{2}$$

$$p_3 = 3p_{org}^{t-1} - 3p_{org}^{t-2} + p_{org}^{t-3} \tag{3}$$

The same applies to the orientation information. That is, the three pieces of orientation information to be generated respectively correspond to the orientation static model, uniform velocity motion model, and uniform acceleration motion model. Therefore, orientation information $q_1$ corresponds to the orientation static model, orientation information $q_2$ corresponds to the uniform velocity motion model, and orientation information $q_3$ corresponds to the uniform acceleration motion model.

$q_1$, $q_2$, and $q_3$ are respectively calculated by:

$$q_1 = q_{org}^{t-1} \tag{4}$$

$$q_2 = \dot{q}_{org}^{t-1} q_{org}^{t-1} (\dot{q}_{org}^{t-1} = q_{org}^{t-1} \overline{q}_{org}^{t-2}) \tag{5}$$

$$q_3 = \ddot{q}_{org}^{t-1} \dot{q}_{org}^{t-1} q_{i-1} (\dot{q}_{org}^{t-2} = q_{org}^{t-2} \overline{q}_{org}^{t-3}, \ddot{q}_{org}^{t-1} = \dot{q}_{org}^{t-1} \overline{\dot{q}}_{org}^{t-2}) \tag{6}$$

where $$\overline{q} \tag{7}$$

represents a conjugate quaternion of a quaternion q.

Figure 13:
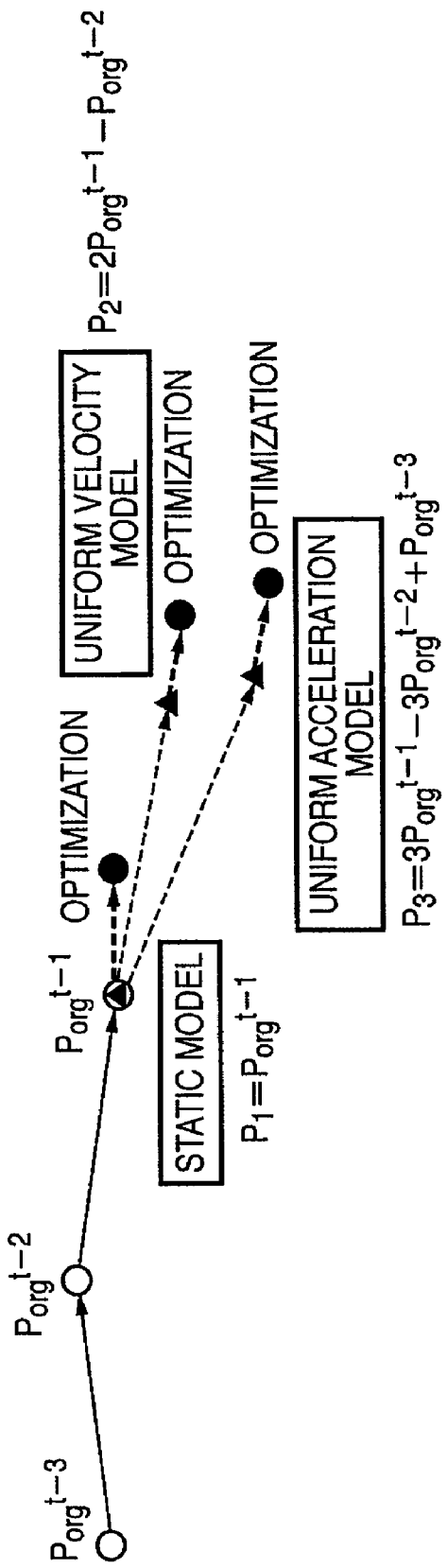
FIG. 13 is a view for explaining a generation method of the position and orientation in step S1040.

FIG. 13 is a view for explaining the position and orientation generation method in step S1040. FIG. 13 shows the generation method of the positions $p_1$, $p_2$, and $p_3$. As shown in FIG. 13, using the three pieces of position information $p_{org}^{t-1}$, $p_{org}^{t-2}$, and $p_{org}^{t-3}$ (indicated by blank circles in FIG. 13) stored in the position and orientation storage unit 170, three pieces of position information $p_1$, $p_2$, and $p_3$ (indicated by triangles) are generated. The positions $p_1$, $p_2$, and $p_3$ are generated according to the static model, uniform velocity model, and uniform acceleration model. Using generated $p_1$, $p_2$, and $p_3$ as initial values in iterative operations, nonlinear optimization calculations are made in step S1060. As a result of optimization, different positions and orientations are obtained (FIG. 13 shows only the positions by full circles). In step S1090, a best suited position and orientation of those obtained by optimization are selected, and are stored as those for a frame t in the position and orientation storage unit 170.

In this step, the position and orientation generation unit 160 selects one of $p_1$ to $p_3$ and one of $q_1$ to $q_3$ to form a set, and generates sets for all combinations. In this embodiment, the unit 160 generates nine (=M) sets: St(1)=($p_1$, $q_1$), St(2)=($p_1$, $q_2$), St(3)=($p_1$, $q_3$), St(4)=($p_2$, $q_1$), St(5)=($p_2$, $q_2$), St(6)=($p_2$, $q_3$), St(7)=($p_3$, $q_1$), St(8)=($p_3$, $q_2$), and St(9)=($p_3$, $q_3$).

(Step S1050)

In step S1050, the apparatus 1 initializes the value of a variable i (e.g., a register of the position and orientation calculation unit 140) to 1.

(Step S1060)

In step S1060, the apparatus 1 calculates the position and orientation of the image sensing device 100L by correcting the position information and orientation information which configure St(i) using nonlinear optimization calculations by iterative operations. Let Nc be the total number of division points, which are not occluded and for which corresponding points are calculated in step S1030, of the division points DPj.

Figure 9:
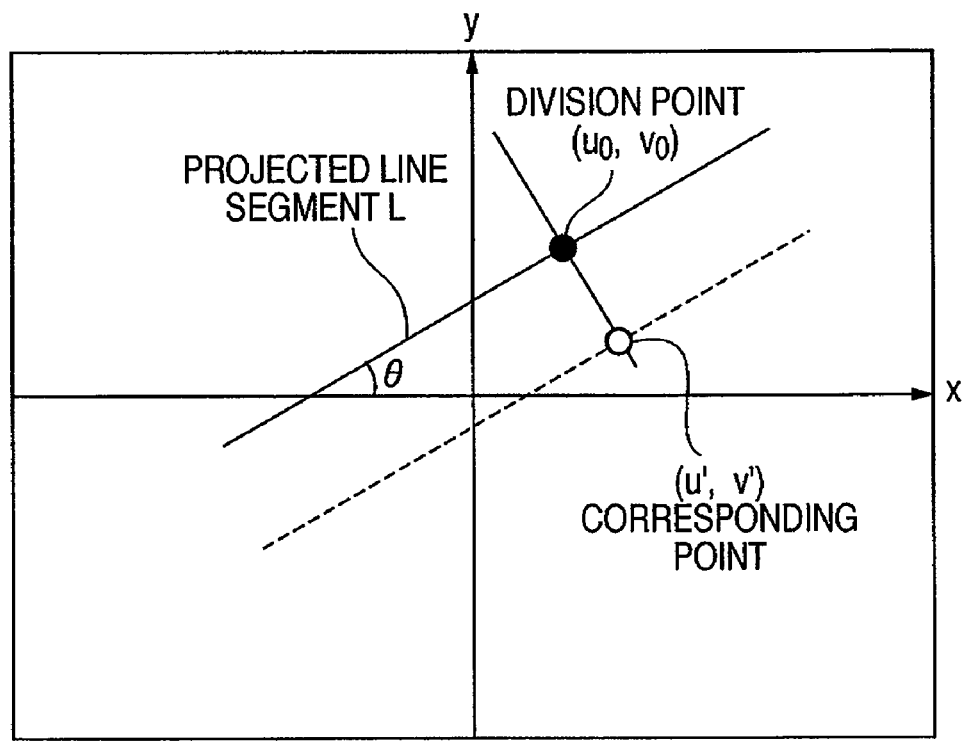
FIG. 9 is a view for explaining the position and orientation of the image sensing device 100L using edge information.

FIG. 9 is a view for explaining the method of calculating the position and orientation of the image sensing device 100L using edge information. In FIG. 9, the horizontal and vertical directions of the physical space image are respectively defined as x- and y-axes. Let ($u_0$, $v_0$) be the projected image coordinates of a certain division point, and θ be the slope of a line segment L, to which the division point of interest belongs, on the physical space image, with respect to the x-axis. The slope θ is calculated as that of a straight line by projecting the 3D coordinates of the two ends of the line segment onto the physical space image based on the position information and orientation information, and connecting the coordinates of the two ends on the physical space image. A normal vector of the line segment L on the physical space image is (sin θ, −cos θ). Also, let (u', v') be the image coordinates of a corresponding point of the division point of interest.

An equation of a straight line which passes through a point (u, v) and has a slope θ can be expressed by:

$$x \sin\theta - y \cos\theta = u \sin\theta - v \cos\theta \quad (8)$$

The projected coordinates of the division point onto the physical space image change depending on the position and orientation of the image sensing device 100L. The degrees of freedom the position and orientation of the image sensing device 100L are six degrees of freedom. Let s be a parameter which represents the position and orientation of the image sensing device 100L. s is a six-dimensional vector, and includes three elements representing the position of the image sensing device 100L, and three elements representing its orientation. The three elements representing the orientation are expressed by, for example, an Euler angle, a three-dimensional vector in which the direction represents the rotation axis, and the magnitude represents the rotation angle, or the like. The image coordinates (u, v) of the division point can be approximated by linear Taylor expansion in the vicinity of ($u_0$, $v_0$) as:

$$u \approx u_0 + \sum_{i=1}^{6} \frac{\partial u}{\partial s_i} \Delta s_i, \; v \approx v_0 + \sum_{i=1}^{6} \frac{\partial v}{\partial s_i} \Delta s_i \quad (9)$$

Since the derivation method of partial differentials $\partial u/\partial s_i$ and $\partial v/\partial s_i$ of u and v are known to those who are skilled in the art, as disclosed in non-patent reference 10, a repetitive description thereof will be avoided.

Substitution of equations (9) into equation (8) yields:

$$x\sin\theta - y\cos\theta = \left(u_0 + \sum_{i=1}^{6} \frac{\partial u}{\partial s_i}\Delta s_i\right)\sin\theta - \left(v_0 + \sum_{i=1}^{6} \frac{\partial v}{\partial s_i}\Delta s_i\right)\cos\theta \quad (10)$$

A correction value Δs of the position and orientation s of the image sensing device 100L is calculated so that the straight line given by equation (10) passes through the image coordinates (u', v') of the corresponding point of the division point of interest. If $r_0 = u_0 \sin\theta - v_0 \cos\theta$ (constant) and $d = u' \sin\theta - v' \cos\theta$ (constant), we have:

$$\sin\theta \sum_{i=1}^{6} \frac{\partial u}{\partial s_i}\Delta s_i - \cos\theta \sum_{i=1}^{6} \frac{\partial v}{\partial s_i}\Delta s_i = d - r_0 \quad (11)$$

Since equation (11) holds for Nc division points, a linear simultaneous equation for Δs holds, as given by:

$$\begin{bmatrix} \sin\theta_1 \frac{\partial u_1}{\partial s_1} - \cos\theta_1 \frac{\partial v_1}{\partial s_1} & \sin\theta_1 \frac{\partial u_1}{\partial s_2} - \cos\theta_1 \frac{\partial v_1}{\partial s_2} & \cdots & \sin\theta_1 \frac{\partial u_1}{\partial s_6} - \cos\theta_1 \frac{\partial v_1}{\partial s_6} \\ \sin\theta_2 \frac{\partial u_2}{\partial s_1} - \cos\theta_2 \frac{\partial v_2}{\partial s_1} & \sin\theta_2 \frac{\partial u_2}{\partial s_2} - \cos\theta_2 \frac{\partial v_2}{\partial s_2} & \cdots & \sin\theta_2 \frac{\partial u_2}{\partial s_6} - \cos\theta_2 \frac{\partial v_2}{\partial s_6} \\ \vdots & \vdots & \ddots & \vdots \\ \sin\theta_{N_c} \frac{\partial u_{N_c}}{\partial s_1} - \cos\theta_{N_c} \frac{\partial v_{N_c}}{\partial s_1} & \sin\theta_{N_c} \frac{\partial u_{N_c}}{\partial s_2} - \cos\theta_{N_c} \frac{\partial v_{N_c}}{\partial s_2} & \cdots & \sin\theta_{N_c} \frac{\partial u_{N_c}}{\partial s_6} - \cos\theta_{N_c} \frac{\partial v_{N_c}}{\partial s_6} \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} d_1 - r_1 \\ d_2 - r_2 \\ \vdots \\ d_{N_c} - r_{N_c} \end{bmatrix} \quad (12)$$

Equation (12) is briefly expressed by:

$$J\Delta s = E \quad (13)$$

Based on equation (13), Δs is calculated by, for example, a Gauss-Newton method using a generalized inverse matrix $(J^T \cdot J)^{-1}$ of a matrix J. However, since edge detection suffers many detection errors, the robust estimation method to be described below is used. In general, at a division point corresponding to an erroneously detected edge, (d−r) becomes large. For this reason, the degree of contribution to simultaneous equations of equations (12) and (13) becomes large, and the precision of obtained Δs lowers consequently. Hence, a small weight is given to data of a division point with a large error (d−r), and a large weight is given to data of a division point with a small error (d−r). The weight is given by a Tukey function as described by:

$$w(d-r) = \begin{cases} (1-((d-r)/c)^2)^2 & |d-r| \le c \\ 0 & |d-r| > c \end{cases} \quad (14)$$

where c is a constant. Note that the function that gives a weight is not limited to the Tukey function. For example, as long as a small weight is given to data of a division point with a large error (d−r), and a large weight is given to data of a division point with a small error (d−r), a Huber function may be used, as described by:

$$w(d-r) = \begin{cases} 1 & |d-r| \le k \\ k/|d-r| & |d-r| > k \end{cases} \quad (15)$$

Let $w_i$ be the weight corresponding to the division point DPi. Note that a weight matrix W is defined by:

$$W = \begin{bmatrix} w_1 & & & 0 \\ & w_2 & & \\ & & \ddots & \\ 0 & & & w_{N_c} \end{bmatrix} \quad (16)$$

The weight matrix W is an Nc×Nc square matrix including all zeros other than diagonal components. The weights $w_i$ are set as the diagonal components. Using this weight matrix W, equation (13) is modified as:

$$WJ\Delta s = WE \quad (17)$$

The correction value Δs is calculated by solving equation (17) like:

$$\Delta s = (J^T W J)^{-1} J^T W E \quad (18)$$

Using Δs obtained in this manner, the position and orientation of the image sensing device 100L are updated like s+Δs→s.

It is then checked if the iterative operations of the position and orientation of the image sensing device 100L have converged. When the correction value Δs is sufficiently small, when the sum total of errors (r−d) is sufficiently small, or when the sum total of errors (r−d) remains unchanged, it is determined that the calculations of the position and orientation of the image sensing device 100L have converged. If it is determined that the calculations have not converged yet, the slopes θ of line segments, $r_0$, d, and partial differentials of u and v are calculated again using the updated position and orientation of the image sensing device 100L, and the correction value Δs is calculated again according to equation (18).

Note that the Gauss-Newton method is used as the nonlinear optimization method. However, the nonlinear optimization method is not limited to such specific method, and other nonlinear optimization methods such as a Newton-Raphson method, Levenberg-Marquardt method, steepest descent method, conjugate gradient method, and the like may be used.

(Step S1070)
The apparatus 1 checks in step S1070 if the processing in step S1060 has been executed for all the sets St(1) to St(9). That is, it is checked if i=M. As a result of checking, if the processing in step S1060 has been executed for all the sets St(1) to St(9) (if i=M), the process advances to step S1090. On the other hand, if the processing in step S1060 has not been executed for all the sets St(1) to St(9) yet, the process advances to step S1080.

(Step S1080)
In step S1080, the apparatus 1 increments the value of the variable i by one.

(Step S1090)
In step S1090, the position and orientation selection unit 150 selects the most adequate one of the sets St(1) to St(9) calculated in step S1060, and stores the position information and orientation information which configure the selected set in the position and orientation storage unit 170. In this embodiment, the average value of the weights used in the aforementioned robust estimation is used as a measure for evaluation of the adequacy of the position and orientation. Adequacy C is calculated by:

$$C = \frac{1}{N_c} \sum w_j \quad (19)$$

That is, adequacies C (evaluation value) are calculated for respective sets, and the position information and orientation information which configure the set with a largest adequacy C are stored in the position and orientation storage unit 170.

(Step S1032)
In step S1032, since the position and orientation storage unit 170 stores the position information and orientation information for only k (1≦k<3) frames, the processes in steps S1040 to S1090 are executed using $p_1$ to $p_k$ and $q_1$ to $q_k$. That is, the process to be executed in step S1032 is substantially the same as those to be executed in steps S1040 to S1090, except for the number of frames associated with the position information and orientation information stored in the position and orientation storage unit 170.

Figure 4:
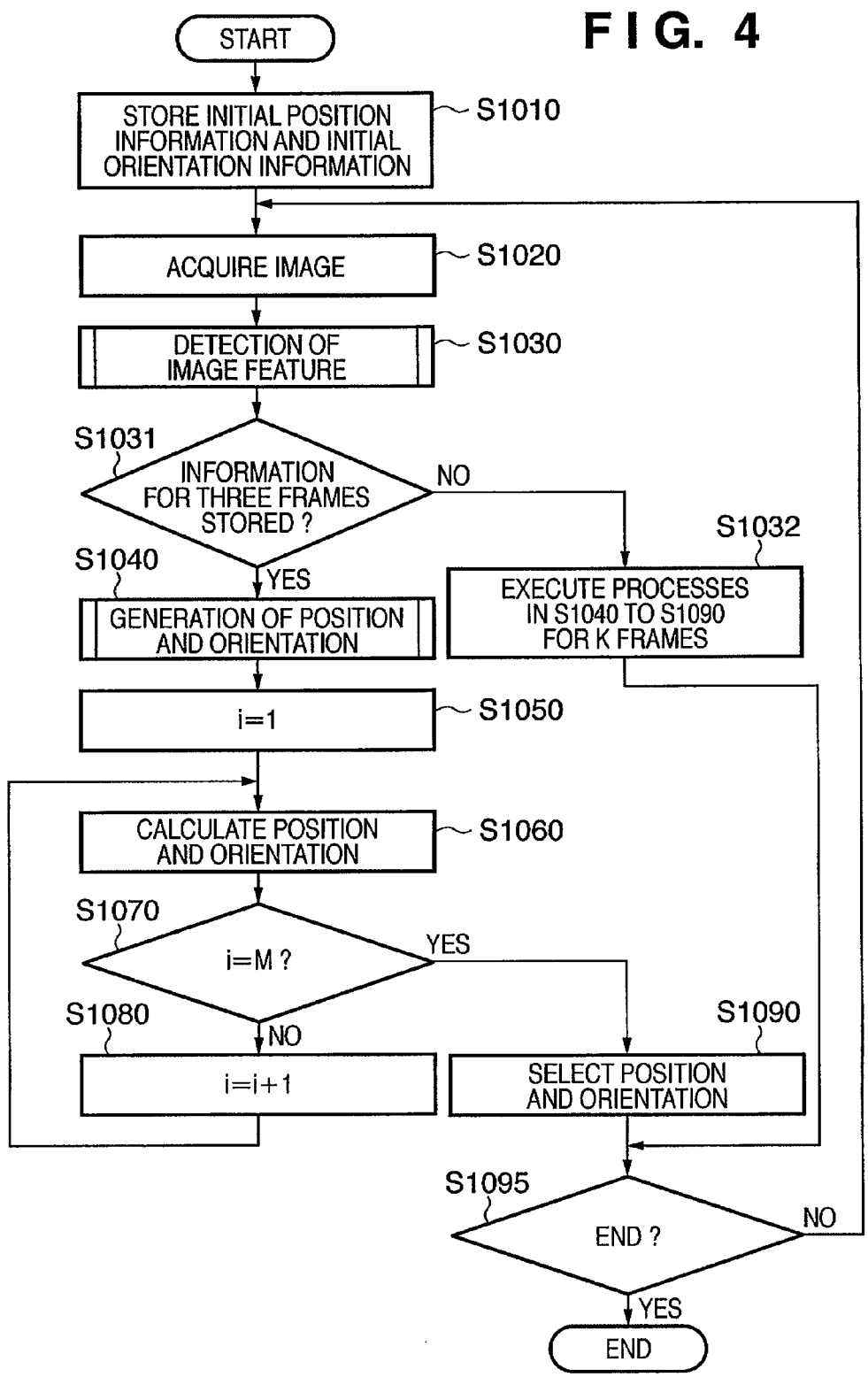
FIG. 4 is a flowchart of the processing for calculating the position and orientation of the image sensing device 100L, which is executed by the position and orientation measuring apparatus 1.

(Step S1095)
If the apparatus 1 externally receives an end instruction of the processing according to the flowchart of FIG. 4 or if a condition to end the processing is satisfied in step S1095, it ends this processing. On the other hand if neither an end instruction is input nor a condition to end the processing is satisfied, the process returns to step S1020 to repeat the subsequent processes.

As described above, according to this embodiment, the registration can be avoided from collapsing due to high-speed motion of the image sensing device 100L, and the stability of the registration using natural features can be improved.

<Modification>
In the above description, edge detection is executed once per frame. That is, edge detection is executed once using the latest position information and orientation information stored in the position and orientation storage unit 170. However, the number of times of execution of edge detection is not limited to once per frame.

If there is sufficient time to be spent for the edge detection processing, model projection may be executed for each set to execute edge detection. If edge detection is executed for each set, the convergence of the iterative operations can be enhanced, and the precision of the position and orientation measurements can be improved.

Second Embodiment

In the first embodiment, a pair of position information and orientation information for each frame are stored in the position and orientation storage unit 170. In this embodiment, a plurality of pairs of position information and orientation information are stored in a position and orientation storage unit 270.

In the following description, assume that components and the like which are not especially referred to are the same as those in the first embodiment.

Figure 10:
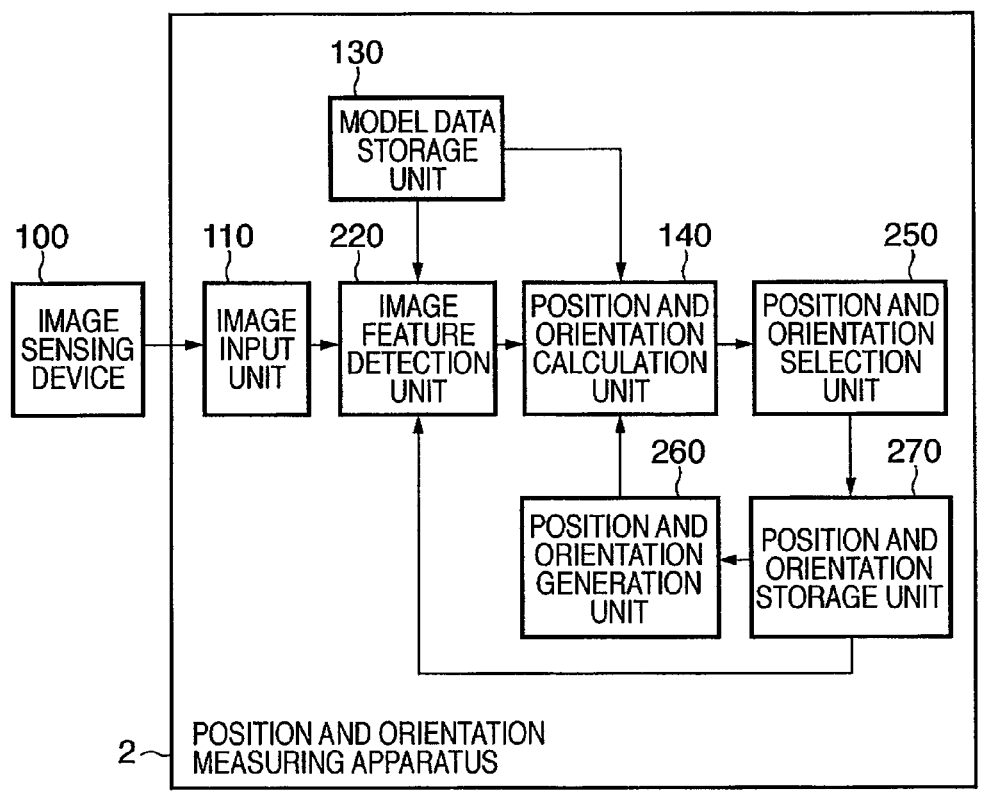
FIG. 10 is a block diagram showing the functional arrangement of a position and orientation measuring apparatus 2 according to the second embodiment of the present invention.

FIG. 10 is a block diagram showing the functional arrangement of a position and orientation measuring apparatus 2 according to this embodiment. The same reference numerals in FIG. 10 denote the same components as those in FIG. 1, and a repetitive description thereof will be avoided.

A position and orientation storage unit 270 stores a plurality of positions and orientations of the image sensing device 100L, which are calculated by the position and orientation calculation unit 140, for images of several past frames (for example, images for three frames before the current frame). Note that the position and orientation storage unit 270 stores the position and orientation with a highest adequacy (principal position and orientation) of those of the image sensing device 100L, which are calculated by the position and orientation calculation unit 140, for images of several past frames (for example, images for three frames before the current frame), so as to be identifiable from others.

In this embodiment, assume that the position and orientation storage unit 270 stores the position and orientation of the image sensing device 100L, which were calculated by the position and orientation calculation unit 140 using the immediately preceding frame, those of the image sensing device 100L, which were calculated by the position and orientation calculation unit 140 using the second preceding frame, and those of the image sensing device 100L, which were calculated by the position and orientation calculation unit 140 using the third preceding frame. Of course, the principal position and orientation of each frame are stored to be identifiable from others.

Before the position and orientation of the image sensing device 100L, which are calculated using an image of an initial frame (e.g., an image of the first frame) are stored in the position and orientation storage unit 270, the position and orientation storage unit 270 stores, as the principal position and orientation, the initial position and orientation of the image sensing device 100L, which are obtained from the initialization processing described in the first embodiment.

An image feature detection unit 220 detects edges from an image by the same processing as in the first embodiment using the principal positions and orientations stored in the position and orientation storage unit 270.

A position and orientation generation unit 260 generates a plurality of positions and orientations from a plurality of positions and orientations stored in the position and orientation storage unit 270.

A position and orientation selection unit 250 combines a plurality of positions and orientations, which are considered to be identical positions and orientations, of those calculated by the position and orientation calculation unit 140, selects a most adequate position and orientation as the principal position and orientation, and stores them in the position and orientation storage unit 270. Also, the unit 250 stores a plurality of positions and orientations with top several adequacies in the position and orientation storage unit 270. Note that an image of the virtual object 20 is rendered using the principal position and orientation selected by the position and orientation selection unit 250.

The processing for calculating the position and orientation of the image sensing device 100L, which is executed by the position and orientation measuring apparatus 2, will be described below with reference to FIG. 11 which shows the flowchart of that processing.

(Step S2010)

In step S2010, the position and orientation measuring apparatus 2 stores, in the position and orientation storage unit 270, initial position information indicating an initial position and initial orientation information indicating an initial orientation of the image sensing device 100L as the principal position information and principal orientation information. The process executed in this step is the same as that in step S1010.

(Step S2020)

In step S2020, the image input unit 110 acquires data of an image (physical space image) sensed by the image sensing device 100L, and transfers it to the following image feature detection unit 220, as in step S1020.

(Step S2030)

In step S2030, the image feature detection unit 220 detects edges from an image by the same process as in step S1030, using the principal position and orientation stored in the position and orientation storage unit 270.

(Step S2031)

The position and orientation calculation unit 140 checks in step S2031 if the position information and orientation information for three frames are stored in the position and orientation storage unit 270. As a result of this checking, if these positions and orientations are stored in the position and orientation storage unit 270, the process advances to step S2040; otherwise, the process advances to step S2032.

(Step S2040)

In step S2040, the position and orientation generation unit 260 calculates a plurality of pieces of position information $p_i(j)$ (i=1, 2, ..., I) using pieces of position information $p_{org}^{t-1}(j)$ (j=1, 2, ..., N), $p_{org}^{t-2}$, and $p_{org}^{t-3}$ stored in the position and orientation storage unit 270. Note that the position information is a 3D vector which represents the position of the image sensing device 100L on the 3D space, as in the first embodiment.

Note that $p_{org}^{t-1}(j)$ is the j-th position information of N pieces of position information stored in the position and orientation storage unit 270 for the immediately preceding frame. The position information $p_{org}^{t-1}(j)$ includes the principal position information for the immediately preceding frame. Also, $p_{org}^{t-2}$ is the principal position information stored in the position and orientation storage unit 270 for the second preceding frame. Furthermore, $p_{org}^{t-3}$ is the principal position information stored in the position and orientation storage unit 270 for the third preceding frame.

The position and orientation generation unit 260 calculates a plurality of pieces of orientation information $q_i(j)$ (i=1, 2, ..., I) using pieces of orientation information $q_{org}^{t-1}(j)$ (j=1, 2, ..., N), $q_{org}^{t-2}$, and $q_{org}^{t-3}$ stored in the position and orientation storage unit 270. Note that the orientation information is a quaternion representing the orientation of the image sensing device 100L, as in the first embodiment.

Note that $q_{org}^{t-1}(j)$ is the j-th orientation information of N pieces of orientation information stored in the in the position and orientation storage unit 270 for the immediately preceding frame. The orientation information $q_{org}^{t-1}(j)$ includes the principal orientation information for the immediately preceding frame. Also, $q_{org}^{t-2}$ is the principal orientation information stored in the position and orientation storage unit 270 for the second preceding frame. Furthermore, $q_{org}^{t-3}$ is the principal orientation information stored in the position and orientation storage unit 270 for the third preceding frame.

Since the numbers (I) of pieces of position information and orientation information to be generated match the numbers of motion models of the image sensing device 100L as in the first embodiment, I=3.

For each j, $p_1(j)$, $p_2(j)$, $p_3(j)$, $q_1(j)$, $q_2(j)$, and $q_3(j)$ are respectively calculated in the same manner as in the first embodiment.

That is, $p_1(j)$ is calculated using only $p_{org}^{t-1}(j)$. $p_2(j)$ is calculated using $p_{org}^{t-1}(j)$ and $p_{org}^{t-2}$. $p_3(j)$ is calculated using $p_{org}^{t-1}(j)$, $p_{org}^{t-2}$, and $p_{org}^{t-3}$.

Likewise, as for the orientation information, $q_1(j)$ is calculated using only $q_{org}^{t-1}(j)$. $q_2(j)$ is calculated using $q_{org}^{t-1}(j)$ and $q_{org}^{t-2}$. $q_3(j)$ is calculated using $q_{org}^{t-1}(j)$, $q_{org}^{t-2}$, and $q_{org}^{t-3}$.

In this step, the position and orientation generation unit 260 selects one of $p_1(j)$ to $p_3(j)$ and one of $q_1(j)$ to $q_3(j)$ to form a set, and generates sets for all combinations. In this embodiment, the unit 260 generates nine sets: $St_j(1)=(p_1(j), q_1(j))$, $St_j(2)=(p_1(j), q_2(j))$, $St_j(3)=(p_1(j), q_3(j))$, $St_j(4)=(p_2(j), q_1(j))$, $St_j(5)=(p_2(j), q_2(j))$, $St_j(6)=(p_2(j), q_3(j))$, $St_j(7)=(p_3(j), q_1(j))$, $St_j(8)=(p_3(j), q_2(j))$, and $St_j(9)=(p_3(j), q_3(j))$. Since these sets are calculated for all of j=1 to N, 9×N (=M) sets are consequently generated.

(Step S2050)

In step S2050, the apparatus 2 initializes the value of a variable i and that of a variable j to 1.

(Step S2060)

In step S2060, the apparatus 2 calculates the position and orientation of the image sensing device 100L by correcting the position information and orientation information which configure $St_j(i)$ using nonlinear optimization calculations by iterative operations. This process is executed in the same manner as in step S1060.

(Step S2070)

The apparatus 2 checks in step S2070 if i=9. As a result of checking, if i=9, the process advances to step S2071; if i<9, the process advances to step S2080.

(Step S2080)

The apparatus 2 increments the value of the variable i by one, and the process returns to step S2060.

(Step S2071)

The apparatus 2 checks in step S2071 if j=N. As a result of checking, if j=N, the process advances to step S2090; if j<N, the process advances to step S2072.

(Step S2072)

In step S2072, the apparatus 2 increments the value of the variable j by one.

(Step S2073)

In step S2073, the apparatus 2 initializes the value of the variable i to 1, and the process returns to step S2060.

(Step S2090)

In step S2090, the position and orientation selection unit 250 combines a plurality of positions and orientations, which are considered as an identical position and orientation, of those calculated in step S2060. The unit 250 then selects a most adequate position and orientation, and stores them as principal position information and principal orientation information in the position and orientation storage unit 270. Also, the unit 250 stores a plurality of positions and orientations with top several adequacies in the position and orientation storage unit 270.

FIG. 12 is a flowchart showing details of the process in step S2090.

In step S2110, the position and orientation selection unit 250 sets a number (maximum value) T (corresponding to N) to be stored in the position and orientation storage unit 270 of the M sets (of positions and orientations) calculated in step S2060. The maximum number T may be determined in advance, or the user may appropriately select and input the number.

In step S2120, the position and orientation selection unit 250 calculates adequacies C for respective M sets calculated in step S2060 using equation (19). The unit 250 sorts these M sets in descending order of adequacy C. Then, the unit 250 sets a processed flag Fk (k=1, 2, . . . , M) of each set to be FALSE.

In step S2130, the position and orientation selection unit 250 initializes the values of variables i and j to 1.

In step S2140, the position and orientation selection unit 250 searches the sorted sets for a set k (k=j+1, j+2, . . . , M) which includes the position and orientation which are considered to be identical to those in the j-th set, and sets the processed flag Fk of the found set to be TRUE. Whether or not the positions and orientations are identical are determined as follows.

Let $p_j$ be position information which configures the j-th set, and $q_j$ be orientation information. Furthermore, let $p_{comp}$ be position information which configures a set to be compared with the j-th set, and $q_{comp}$ be orientation information.

In such a case, the difference between the two pieces of position information is calculated as the distance between two points like:

$$D_{trans}=|p_j-p_{comp}| \quad (20)$$

The difference between the two pieces of orientation information is calculated as follows. Initially, a quaternion $q_{dif}$ is calculated by:

$$q_{dif}=q_j\overline{q}_{comp} \quad (21)$$

Let θ be the rotation angle of $q_{dif}$. Then, a real number part $a_{dif}$ of the quaternion $q_{dif}$ represents cos(θ/2). The difference between the two orientations is calculated as the absolute value of the rotation angle θ by:

$$D_{rot}=|2\arccos(a_{dif})| \quad (22)$$

Whether or not the positions and orientations are identical are determined by seeing if both the values calculated using equations (20) and (22) are smaller than a threshold which is set in advance. If both the values are smaller than the threshold set in advance, the two pairs of positions and orientations are considered to be identical.

The position and orientation selection unit 250 checks in step S2150 if the processed flags of the sets k (k=j+1, j+2, . . . , M) are TRUE. As a result of checking, if the processed flags of all the sets are TRUE, the unit 250 ends this processing, and the process returns to step S2095. On the other hand, if at least one set whose processed flag is not TRUE is found, the process advances to step S2160.

In step S2160, the position and orientation selection unit 250 sets the rank from the top (j=1) of a set whose processed flag is FALSE and which has the adequacy C next higher than that of the j-th set in the variable j.

In step S2170, the position and orientation selection unit 250 increments the value of the variable i by one.

The position and orientation selection unit 250 checks in step S2180 if i>T. As a result of checking if i>T, the unit 250 ends this processing, and the process returns to step S2095.

On the other hand, if i≦T, the process returns to step S2140 to repeat the subsequent processes.

After completion of the processing according to the flowchart of FIG. 12, top T sets of those whose processed flags are FALSE and have higher adequacies C are stored in the position and orientation storage unit 270. Of the stored T sets, the position information and orientation information which configure a set with the highest adequacy C are respectively determined as principal position information and principal orientation information.

(Step S2032)

Referring back to FIG. 11, in step S2032 since the position and orientation storage unit 270 stores the position information and orientation information for only k (1≦k<3) frames, the processes in steps S2040 to S2090 are executed using $p_1(j)$ to $p_k(j)$ and $q_1(j)$ to $q_k(j)$. That is, the process to be executed in step S2032 is substantially the same as those to be executed in steps S2040 to S2090, except for the number of frames associated with the position information and orientation information stored in the position and orientation storage unit 270.

(Step S2095)

Figure 11:
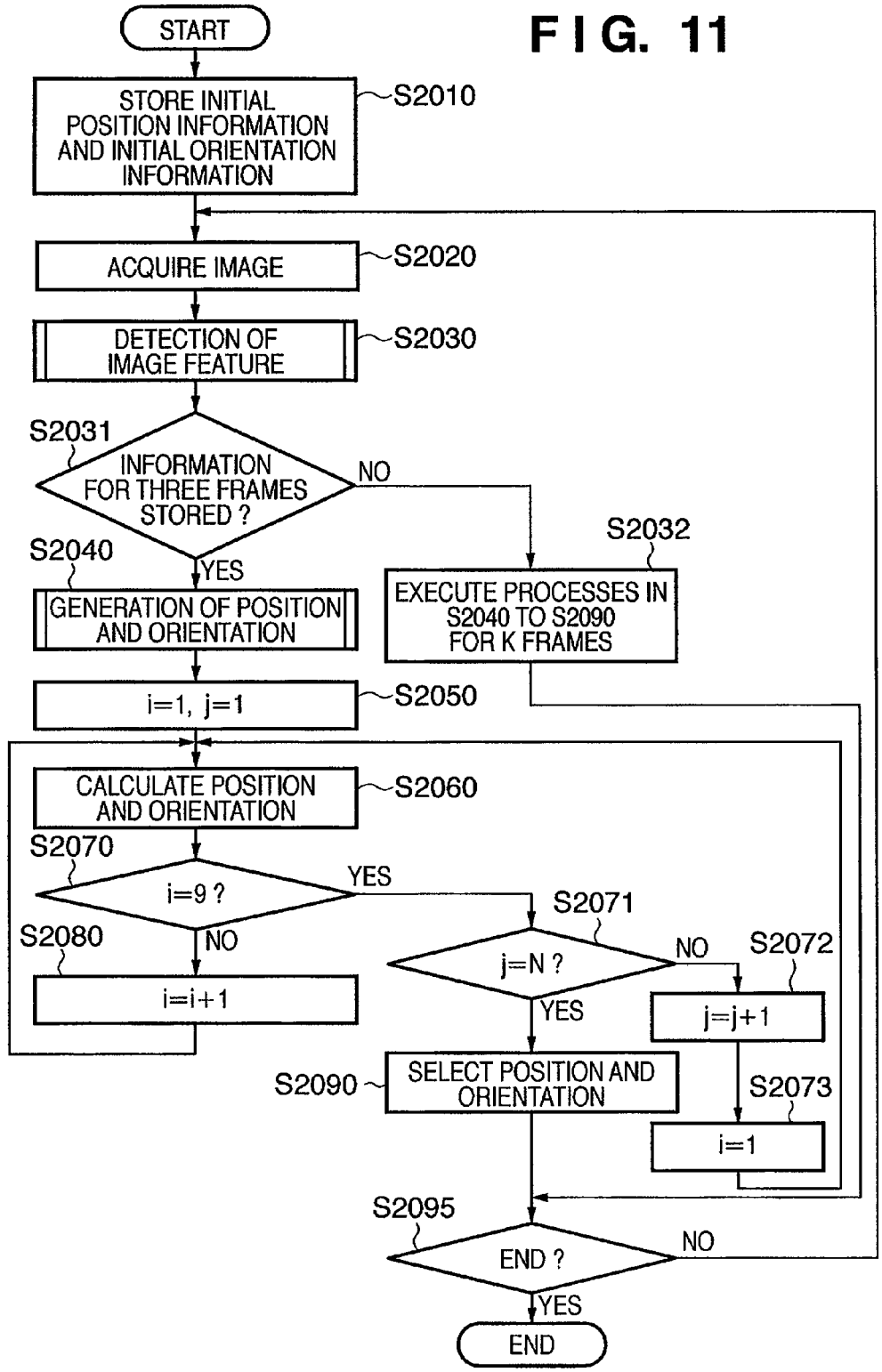
FIG. 11 is a flowchart of the processing for calculating the position and orientation of the image sensing device 100L, which is executed by the position and orientation measuring apparatus 2.

If the apparatus 2 externally receives an end instruction of the processing according to the flowchart of FIG. 11 or if a condition to end the processing is satisfied in step S2095, it ends this processing. On the other hand if neither an end instruction is input nor a condition to end the processing is satisfied, the process returns to step S2020 to repeat the subsequent processes.

As described above, according to this embodiment, the collapse of the position and orientation calculations can be prevented by generating a plurality of positions and orientations based on a plurality of positions and orientations obtained from the previous frame, calculating the position and orientation of the image sensing device nonlinearly for each set of these positions and orientations, and selecting the most adequate position and orientation from them.

<Modification>

In the second embodiment, edge detection is executed once per frame. That is, edge detection is executed once using the principal position and orientation stored in the position and orientation storage unit 270. However, the number of times of execution of edge detection is not limited to once per frame. If there is enough time to be spent for the edge detection processing, model projection may be executed in accordance with the respective positions and orientations generated by the position and orientation generation unit 260 to execute edge detection. Also, model projection may be executed based on the N positions and orientations stored in the position and orientation storage unit 270. Since the convergence of the iterative operations can be enhanced by executing edge detection using positions and orientations having values as close as possible, the precision of the position and orientation measurements can be improved.

Third Embodiment

Various modifications will be described below.

Modification 1

In the first and second embodiments, upon execution of edge detection, one edge is detected as a corresponding point for each division point. However, the number of corresponding points to be detected is not limited to one, and a plurality of edges may be detected as corresponding point candidates, as described in non-patent reference 4.

The position and orientation calculation unit 140 uses a corresponding point candidate closest to a line segment projected onto an image based on a certain position and orientation upon calculation of the position and orientation. When a plurality of corresponding point candidates are stored and the corresponding point is switched for each repetition step of iterative operations, the influence of correspondence errors can be minimized when the initial values have poor precision.

Modification 2

In the first or second embodiment, the position and orientation selection unit 150 or 250 merely selects the position and orientation based on the adequacy of the position and orientation. However, when the adequacy of the position and orientation with a highest adequacy is not sufficient, that is, when the adequacy calculated by equation (19) is equal to or lower than a given threshold, it is considered that the position and orientation calculations collapse. Hence, the unit 150 or 250 may prompt the position and orientation measuring apparatus to execute re-initialization processing.

The re-initialization processing may be automatically executed by, for example, the process in step S1010 in FIG. 4, or the position and orientation selection unit 150 or 250 may notify the user to execute re-initialization. As a result, even when the position and orientation calculations collapse, the position and orientation calculations can be continued after re-initialization.

Modification 3

In the first or second embodiment, the position and orientation generation unit 160 or 260 generates positions and orientations based on motion models such as static models, uniform velocity/uniform angular velocity models, and uniform acceleration/uniform angular acceleration models. However, the position and orientation generation method is not limited to such a specific method. For example, the position and orientation may be generated based on a random motion having the position and orientation stored in the position and orientation storage unit 170 or 270 as a start point. Alternatively, a new position and orientation may be generated based on both the aforementioned motion models and random motion. In addition, any other motion models may be used as long as they can specify motions of an object.

Modification 4

In the first or second embodiment, the position and orientation selection unit 150 or 250 determines the adequacy of the position and orientation based on the average value of the weights of robust estimation. However, the adequacy determination method is not limited to such specific method.

For example, line segments of a 3D model may be rendered again using the calculated position and orientation, and the sum total of distances between the rendered line segments and corresponding points may be used. Alternatively, the sum total of distances obtained by weighting the aforementioned distance by the weights of robust estimation may be used. Furthermore, a threshold may be set for the aforementioned distances, and the number of corresponding points whose distances are smaller than the threshold may be used. Moreover, the total number of division points with nonzero weights or the ratio of division points with nonzero weights to the total number of division points may be used. In this way, any other methods can be used as long as they can evaluate the adequacy of the calculated position and orientation.

Modification 5

In the first or second embodiment, whether or not two positions are identical is determined based on the distance between two points, and whether or not two orientations are identical is determined based on the absolute value of the rotation angle between the two orientations. However, the determination method of the identical positions and orientations is not limited to such a specific method.

For example, a quaternion which expresses the orientation is considered a four-dimensional vector, and determination may be done based on the distance between the four-dimensional vectors. The orientation may be expressed by a 3×3 rotation matrix in place of the quaternion, and whether or not a rotation matrix representing a relative orientation between two orientations is close to a unit matrix may be determined. Furthermore, using a 4×4 conversion matrix including both the position and orientation, and determination may be made using the differences between elements of the two 4×4 conversion matrices. In this way, the determination method of identical positions and orientations is not particularly limited as long as it can measure the differences between the two positions and orientations.

Modification 6

In the first or second embodiment, edges are used as natural features. However, the present invention is not limited to them. For example, point features detected by a Harris detector, a SIFT detector described in non-patent reference 8, or the like may be used. In this case, as a 3D model, 3D positions of point features on the reference coordinate system, and image information around features are stored in the model data storage unit. The present invention is not limited to natural features, but it may be applied to artificial markers.

Fourth Embodiment

The above description has been given under the assumption that the respective units which configure the position and orientation measuring apparatus 1 or 2 shown in FIG. 1 or 10 comprise hardware components. However, the units except for the model data storage unit 130 and position and orientation storage unit 170 or 270 may be implemented by software. In this case, a computer such as a PC (personal computer) or the like loads this software, and a CPU of this computer executes that software, so that this computer implements the operations described in the first or second embodiment.

FIG. 14 is a block diagram showing an example of the hardware arrangement of a computer which is applicable to the position and orientation measuring apparatus 1 or 2.

Reference numeral 1401 denotes a CPU which controls the overall computer using programs and data stored in a RAM 1402 and ROM 1403, and executes the respective processes to be implemented by the position and orientation measuring apparatus 1 or 2 to which this computer is applied.

The RAM 1402 has an area for temporarily storing programs and data loaded from an external storage device 1406, and image data of respective frames output from the image sensing device 100L via an I/F (interface) 1407. Also, the RAM 1402 has a work area used when the CPU 1401 executes various processes. That is, the RAM 1402 can provide various areas as needed.

The ROM 1403 stores setting data, a boot program, and the like of this computer.

Reference numeral 1404 denotes an operation unit which comprises a keyboard, mouse, and the like. When the operator of this computer operates this operation unit 1404, he or she can input various instructions to the CPU 1401.

Reference numeral 1405 denotes a display unit which comprises a CRT, liquid crystal display, or the like, and can display processing results of the CPU 1401 by means of images, text, and the like.

The external storage device 1406 serves as a large-capacity information storage device represented by a hard disk drive. The external storage device 1406 stores an OS (operating system), programs and data for making the CPU 1401 implement the functions of the respective units except for the model data storage unit 130 and position and orientation storage unit 170 or 270 shown in FIG. 1 or 11, and the like. The external storage device 1406 also stores information which is set in advance and known information in the above description. The programs and data stored in the external storage device 1406 are loaded onto the RAM 1402 as needed under the control of the CPU 1401. The CPU 1401 executes processes using the loaded programs and data, so that the computer executes the aforementioned processes to be implemented by the position and orientation measuring apparatus 1 or 2.

The I/F 1407 is used to connect the image sensing device 100L to this computer. Image data of frames which form a movie sensed by the image sensing device 100L are output to the RAM 1402 and external storage device 1406 via this I/F 1407.

Reference numeral 1408 denotes a bus which interconnects the aforementioned units.

Note that the arrangement shown in FIG. 14 is merely an example, and the present invention is not limited to such a specific arrangement.

Other Embodiments

The objects of the present invention can be achieved as follows. That is, a recording medium (or storage medium), which records a program code of software that can implement the functions of the above-mentioned embodiments is supplied to a system or apparatus. A computer (or a CPU or MPU) of the system or apparatus reads out and executes the program code stored in the recording medium. In this case, the program code itself read out from the recording medium implements the functions of the above-mentioned embodiments, and the recording medium which records the program code constitutes the present invention.

When the computer executes the readout program code, an operating system (OS) or the like running on the computer performs some or all of actual processing operations based on an instruction of the program code. The present invention also includes a case in which the functions of the above-mentioned embodiments are implemented by this processing.

Furthermore, assume that the program code read out from the recording medium is written in a memory of a function expansion card or a function expansion unit, which is inserted in or connected to the computer. After that, the functions of the above-mentioned embodiments are implemented by some or all of actual processing operations executed by a CPU or the like arranged in the function expansion card or function expansion unit based on an instruction of the program code. Such case is also incorporated in the present invention.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-008496, filed Jan. 17, 2007, which is hereby incorporated by reference herein in its entirety.

What is claimed is:

1. An information processing apparatus connected to an image sensing device which senses a movie of a physical space, comprising:
a calculation unit configured to calculate a plurality of pieces of candidate position and orientation information based on a plurality of pieces of sensing position and orientation information stored in a memory as candidates of a sensing position and a sensing orientation of the image sensing device upon sensing an image of each frame for respective frames which form the movie;
an evaluation unit configured to calculate evaluation values for the plurality of pieces of candidate position and orientation information;
a selection unit configured to select one candidate position and orientation information based on the evaluation values from the plurality of pieces of candidate position and orientation information; and
a recording unit configured to record the candidate position and orientation information selected by said selection unit in the memory as the sensing position and orientation information,
wherein said calculation unit calculates the plurality of pieces of candidate position and orientation information based on a plurality of motion models, and
wherein said evaluation unit comprises a correction unit configured to correct each candidate position and orientation information calculated by said calculation unit, and said evaluation unit calculates an evaluation value for the candidate position and orientation information corrected by said correction unit.

2. The apparatus according to claim 1, wherein said calculation unit independently calculates a candidate position and a candidate orientation as candidate position and orientation information using identical or different motion models for a position and an orientation.

3. The apparatus according to claim 1, wherein motions of the motion models include a static motion, uniform velocity motion, uniform acceleration motion, and random motion.

4. The apparatus according to claim 1, wherein based on errors between detection positions of image features in an image of an acquired frame, and estimated positions of the image features on the image, which are estimated from candidate position information and candidate orientation information that configure the candidate position and orientation information and known three-dimensional information corresponding to the image features, said correction unit calculates correction values of the candidate position information and the candidate orientation information for each candidate position and orientation information, and corrects the candidate position and orientation information based on the calculated correction values.

5. The apparatus according to claim 4, wherein said correction unit calculates weights according to magnitudes of the errors for respective image features and calculates the correction values based on the weights for each candidate position and orientation information.

6. The apparatus according to claim 5, wherein said selection unit calculates, as the estimation value, an average value of the weights for each candidate position and orientation information, and selects candidate position and orientation information with a largest average value.

7. The apparatus according to claim 4, wherein the image features are edges in the image, and the three-dimensional information is expressed by a set of edges.

8. The apparatus according to claim 1, wherein said selection unit selects pieces of candidate position and orientation information, as many as a pre-set number, of the plurality of pieces of candidate position and orientation information, and
said recording unit records the pieces of candidate position and orientation information, as many as the pre-set number, which are selected by said selection unit, in the memory as the sensing position and orientation information.

9. The apparatus according to claim 8, wherein said selection unit combines candidate position and orientation information, which is determined to have a position and an orientation close to a position and an orientation indicated by reference candidate position and orientation information, to the reference candidate position and orientation information as candidate position and orientation information to be combined, and
said selection unit selects pieces of candidate position and orientation information, as many as the pre-set number of pieces of candidate position and orientation information which have larger magnitudes of the evaluation values, of the remaining pieces of candidate position and orientation information other than the candidate position and orientation information to be combined.

10. An information processing method to be executed by an information processing apparatus, which is connected to an image sensing device which senses a movie of a physical space, comprising:
a calculation step of calculating a plurality of pieces of candidate position and orientation information based on a plurality of pieces of sensing position and orientation information stored in a memory as candidates of a sensing position and a sensing orientation of the image sensing device upon sensing an image of each frame for respective frames which form the movie;
an evaluation step of calculating evaluation values for the plurality of pieces of candidate position and orientation information;
a selection step of selecting one candidate position and orientation information based on the evaluation values from the plurality of pieces of candidate position and orientation information; and
a recording step of recording the candidate position and orientation information selected in the selection step in the memory as the sensing position and orientation information,
wherein said calculation step calculates the plurality of pieces of candidate position and orientation information based on a plurality of motion models, and
wherein said evaluation step comprises a correction step of correcting each candidate position and orientation information calculated in said calculation step, and said evaluation step calculates an evaluation value for the candidate position and orientation information corrected in said correction step.

11. A non-transitory computer-readable storage medium storing a computer for making a computer execute an information processing method according to claim 10.

* * * * *